(12) United States Patent
Fay, II et al.

(10) Patent No.: US 10,485,174 B2
(45) Date of Patent: *Nov. 26, 2019

(54) POSITION/HEIGHT-BASED HYDRAULIC SUSPENSION SYSTEM AND METHODS OF USING THE SAME

(71) Applicant: CNH Industrial America, LLC, New Holland, PA (US)

(72) Inventors: Jeffrey B. Fay, II, Oxford, PA (US); Gregory Fasick, Hatfield, PA (US); Madhu Pankaj, West Chester, PA (US); Robert L. Fackler, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/429,950

(22) Filed: Feb. 10, 2017

(65) Prior Publication Data
US 2018/0229570 A1    Aug. 16, 2018

(51) Int. Cl.
*B60G 17/005* (2006.01)
*A01D 67/00* (2006.01)
*B60G 21/073* (2006.01)

(52) U.S. Cl.
CPC ............ *A01D 67/00* (2013.01); *B60G 17/005* (2013.01); *B60G 21/073* (2013.01); *B60G 2200/464* (2013.01); *B60G 2202/152* (2013.01); *B60G 2202/413* (2013.01); *B60G 2204/8304* (2013.01); *B60G 2206/911* (2013.01); *B60G 2300/08* (2013.01); *B60G 2400/252* (2013.01); *B60G 2500/30* (2013.01)

(58) Field of Classification Search
CPC .... B60G 17/00; B60G 17/015; B60G 17/005; B60G 17/052; B60G 17/019; B60G 17/0565; A01D 69/03; A01D 69/00; A01D 41/141
See application file for complete search history.

(56) References Cited

U.S. PATENT DOCUMENTS

| | | | |
|---|---|---|---|
| 3,662,962 A | 5/1972 | Cobey | |
| 4,146,243 A * | 3/1979 | Sims | B62D 61/125 180/24.02 |
| 4,178,007 A | 11/1979 | Martineau | |
| 4,306,686 A | 12/1981 | Urbanczyk | |
| 4,314,709 A * | 2/1982 | Silbernagel | B60G 17/052 280/405.1 |
| 5,231,583 A | 7/1993 | Lizell | |
| 5,253,467 A | 10/1993 | Sims, Jr. | |
| 6,247,712 B1 * | 6/2001 | Smith | B62D 61/12 180/209 |
| 7,159,695 B2 | 1/2007 | Strong | |

(Continued)

*Primary Examiner* — Faye M Fleming
(74) *Attorney, Agent, or Firm* — Patrick M. Sheldrake; Peter K. Zacharias

(57) ABSTRACT

The disclosure relates to a ride height adjustment system useful for self-adjusting casters on suspension systems of harvesters, such as self-propelled windrowers. The suspension system utilizes sensors and hydraulic actuators operably linked to each caster, the hydraulic actuators responding to a detected ride height of the harvester to adjust the position of the casters to achieve the preferred ride height.

14 Claims, 19 Drawing Sheets

(56) References Cited

U.S. PATENT DOCUMENTS

| | | | |
|---|---|---|---|
| 7,726,107 B2* | 6/2010 | Dueckinghaus | A01D 69/03 |
| | | | 56/11.9 |
| 8,020,648 B2 | 9/2011 | Otto | |
| 8,065,054 B2 | 11/2011 | Tarasinski et al. | |
| 8,387,378 B2 | 5/2013 | Payne et al. | |
| 9,145,659 B2 | 9/2015 | Walz et al. | |
| 9,168,784 B2 | 10/2015 | DeChristopher et al. | |
| 9,809,074 B2* | 11/2017 | Strong | B60G 11/28 |
| 2004/0061292 A1 | 4/2004 | Hall | |
| 2014/0262559 A1 | 9/2014 | DeChristopher et al. | |
| 2015/0223386 A1 | 8/2015 | Nafziger et al. | |
| 2016/0113200 A1 | 4/2016 | Gofron et al. | |
| 2019/0029182 A1* | 1/2019 | Glade | A01D 69/03 |

\* cited by examiner

POSITION/HEIGHT-BASED HYDRAULIC SUSPENSION SYSTEM AND METHODS OF USING THE SAME

BACKGROUND

Harvesters such as windrowers, tractors, and forage harvesters have to balance functionality with weight distribution. On one hand, the harvester needs to include a hitch at the front of the vehicle so that it can attach a header or some other harvesting equipment. On the other hand, the harvesting equipment is very heavy when attached on the front of the vehicle. If the vehicle is operating with a header attachment, the shock absorbers must accommodate weight distributed on the front end of the vehicle. If the header is not attached to the vehicle, the weight distribution of the vehicle is altered dramatically on most current vehicle designs such that the front of a harvester may be elevated over a horizontal or substantially horizontal plane. This elevation makes it difficult to attach a header.

Typical construction for such vehicles include front ground wheels mounted on the frame at fixed angles parallel to each other and parallel to a center line of the frame and rear ground wheels mounted on a respective caster. Each of the front ground wheels is typically driven by a respective drive motor which allows variable speed in both the first and second directions such that steering of the tractor is effected by a differential in speed between the front wheels with the rear wheels following the steering in a castering action. A pair of dampers or shock absorbers are each connected between a bracket on a rear axle of the frame and a lever in the caster plane of the caster so as to provide a damping force tending to restrict rotation of the respective second wheel about the respective vertical pivot axis with the damping force at a maximum value when the rear wheels are parallel to the center line in either the forward or reverse directions.

Such hydrostatically driven vehicles used primarily for swathing are commonly used and readily available. The vehicles typically carry at a forward end on suitable sprung supports a header for cutting standing crop with the crop being transported on the header to a suitable discharge location generally centrally of the vehicle for forming a swath in the field from the cut crop.

Such vehicles generally include a pair of front wheels just behind the header which are fixed to the frame of the vehicles so that they remain at an angle parallel to each other and parallel to a center line of the tractor. The tractor is supported at the rear end by a pair of caster wheels which are attached to a cross axle pivotally connected to the frame at a center horizontal pivot point, commonly known as a walking beam. The axle is typically supported relative to the ground with the caster wheels at the ends of the rear axle so that the wheels trail behind a vertical pivot mount for the wheels.

The front wheels only are driven and are driven in a manner which allows full control in the forward and reverse directions so that steering is effected by a differential speed between the two front wheels with the rear wheels following in the conventional castering action.

It is also known that such vehicles can travel more effectively at high speed when reversed in direction so that the driven wheels are at the rear and the caster wheels at the front. The caster wheels of course rotate through 180° to trail behind the vertical pivot which is now forward of the caster wheels as the tractor moves at relatively high speed in this reversed direction.

Maintaining the desired or proper ride height at the rear end of the vehicle is an inherent problem on vehicles of the above type. In some vehicles, the rear end of the vehicle rises dramatically during rapid deceleration while the vehicle is traveling in the forward direction, thereby placing excessive loads on the front of the vehicle. In some vehicles, the rear end of the vehicle lowers or squats dramatically during removal of the header, thereby placing excessive loads on the rear of the vehicle.

Many such vehicles use as the rear suspension of the rear caster wheels air bags (e.g., shock absorbers) as the springing medium, which may be effective when a header is mounted on the front of the vehicle and the vehicle has a higher percentage of weight on the front axle than on the rear axle. However, manual adjustments by the operator of the air bags is necessary when the operator is preparing to remove the header. Such manual adjustments necessitate that the operator exit the vehicle to insert lockout pins into the air bags when removing the header to restrict the rear end of the vehicle from squatting excessively when the weight of the header is removed from the front of the vehicle.

In addition, if the operator is switching from one header to another (e.g., a 16 foot disc head to a much heavier 40 foot draper head), the operator must manually adjust the volume and/or pressure of air in the air bags in order to compensate for the additional ballast that is required to balance the vehicle for the larger head. This activity of manually inserting or removing the lockout pins and/or manually adding air to the air bags can be frustrating and time consuming. The conventional rear suspension systems can also be inconsistent in terms of the ride height due to changes in temperature. For example, if the air bags are properly inflated in the morning, the air inside will expand as the temperature rises, causing the rear end of the vehicle to rise further and necessitating that the operator exit the cabin to manually deflate the air bags. The opposite occurs when operating into the night (e.g., the air bags lose pressure as the temperature decreases, necessitating that the operator manually inflate the air bags). Thus, conventional rear suspension systems require an extensive amount of manual intervention and adjustment from the operator.

For example, FIGS. 1-7 show side, perspective and detailed views of an exemplary conventional windrower 10 having a rear suspension system 12. The windrower 10 generally includes front wheels 14, 16 rotatably mounted to a frame 18, and the rear suspension system 12 mounted to the frame 18. The windrower 10 includes a cabin 20 configured and dimensioned to receive an operator, and having a plurality of controls for operation of the windrower 10, such as controlling a header (not shown) attachable to an attachment mechanism 22 at the front of the windrower 10, controlling movement of the windrower in a forward direction 24, and controlling movement of the windrower in a reverse direction 26. On each side of the windrower, the rear suspension system 12 includes a damper or shock absorber 28a, 28b (e.g., a shock or fixed hydraulic actuator) and an air bag or shock absorber 30 mounted to a rear axle 32a, 32b for regulating positioning of each caster 34, 36 upon which respective caster wheels 38, 40 are mounted. A ballast box 52 is part of the main frame 18 at the rear end of the windrower 10 and provides balance to the rear portion of the windrower 10. A height 60 measured between the bottom of the rear end (e.g., the ballast box 22) and the ground 56 defines the ride height of the windrower 10.

FIGS. 2-7 show detailed views of the rear suspension system 12. The shock absorber 30 includes a top section 42 that is positioned above and receives therein a bottom section 44. The shock absorber 30 includes a dampening element (e.g., a spring, air, or the like) disposed within the shock absorber 30. The top and bottom sections 42, 44 move relative to each other as the dampening element absorbs motions of the casters 34, 36. As shown in FIG. 4, the shock absorber 30 includes a slidable lockout pin 46 disposed below the bottom section 44 with a fastener pin 48 that maintains the desired position of the lockout pin 46. FIG. 4 shows the lockout pin 46 in the extended position, allowing the shock absorber 30 to provide suspension action. FIG. 5 shows the lockout pin 46 in the inserted position to prevent suspension action from the shock absorber 30 when removing the header. As noted above, adjustment of the position of the lockout pin 46 requires manual intervention from the operator, resulting in delay in operation of the windrower 10.

As shown in greater detail in FIGS. 6 and 7, the rear suspension system 12 includes two suspended left-hand and right-hand suspension assemblies. Each assembly includes a rear axle 32a, 32b operably attached to a respective caster 34, 36 through an absorber system which includes a mounting bracket 50a, 50b and a shock or fixed hydraulic actuator 28a, 28b. The casters 34, 36 are typically operably connected to a rear wheel assembly that includes a wheel and tire (e.g., wheels 38, 40) fixed to the bottom portion of the caster 34, 36 and allow some pivotal movement of the rear wheel and rear tire about a vertical axis that coincides with the attachment to the bottom portion of the casters 34, 36. The rear suspension system 12 can be mechanically attached to the frame 18 of the windrower 10. The right and left hand axles 32a, 32b are operably attached to the frame 18 by a plurality of fastening elements, which in this configuration, allow for a suspended left and right handed axle 32a, 32b.

FIG. 1 shows both wheels 38, 40 in contact with the ground 56. However, when the header is mounted to the windrower 10 or the windrower 10 undergoes rapid deceleration while moving in the forward direction 24, the rear end of the windrower 10 can lift the wheels 38, 40 and the rear suspension system 12 off the ground 56, thereby increasing the height 60. When the header is removed from the windrower 10 or the windrower 10 undergoes rapid deceleration while moving in the reverse direction 26, the rear end of the windrower 10 can squat or lower to the ground 56, thereby decreasing the height 60. Such changes in the ride height 60 impart excessive forces on the rear suspension system 12 and the front wheels 14, 16, and generally necessitate manual intervention from the operator to correct based on the particular operation of the windrower 10.

SUMMARY

The disclosure relates to a height and/or position-based hydraulic suspension system (e.g., a rear suspension system) that provides varied rear ride height settings, in-cabin adjustable settings for any header configuration, active ride height adjustment, elimination of rear axle lockout pins, and automatic lockout of the rear axle in a header removal mode. The ride height adjustment or suspension system includes sensors that detect the ride height of the vehicle and/or the extension/retraction of hydraulic actuators to adjust the hydraulic actuators based on the particular mode of operation of the vehicle. In particular, based on the detected ride height and the mode of operation, the sensors transmit signals to hydraulic actuators (or a controller), causing the hydraulic actuators to adjust the ride height of the respective caster.

In accordance with some embodiments of the present disclosure, an exemplary harvester is provided. The harvester comprises a vehicle frame configured for attachment to an implement to be moved in a longitudinal working direction across the ground. The harvester includes at least one rear axle positioned transversely to the longitudinal working direction of the harvester and operably attached to the vehicle frame. The harvester includes first and second casters pivotally mounted to the rear axle. The harvester includes first and second hydraulic actuators. Each hydraulic actuator is in fluid communication with at least one hydraulic circuit, which is operably mounted to the rear axle and is configured for adjusting a ride height of the harvester during operation of the harvester in one or more operable modes.

In some embodiments, the one or more operable modes include a first operable mode in which the harvester operates with the implement at normal speeds. In some embodiments, the one or more operable modes include a second operable mode in which the ride height of the harvester is adjusted up or down. In some embodiments, the one or more operable modes include a third operable mode in which the implement is removed from the harvester. In some embodiments, the one or more operable modes include a fourth operable mode in which the harvester undergoes rapid deceleration. In some embodiments, the one or more operable modes include a fifth operable mode in which the harvester is undergoing servicing.

The harvester includes one or a plurality of sensors configured to detect the ride height of the harvester. In some embodiments, the sensors are rotational potentiometers. In some embodiments, the harvester comprises one or a plurality of sensors configured to detect a magnitude of extension or retraction of the first and second hydraulic actuators. In some embodiments, the sensors are linear sensors internal to the first and second hydraulic actuators.

Barrel ends of the first and second hydraulic actuators are in fluid communication, and rod ends of the first and second hydraulic actuators are in fluid communication. In some embodiments, the harvester includes an accumulator in fluid communication with the first and second hydraulic actuators. The accumulator is in fluid communication with the first and second hydraulic actuators via a hydraulic valve manifold. The hydraulic valve manifold is in fluid communication with a pump and a tank.

In some embodiments, the harvester includes a first pair of ground wheels mounted on the first and second casters. The harvester includes a ballast box mounted to a rear edge of the vehicle frame. The harvester can be chosen from a windrower, a lawn mower, a forage harvester, a tractor, or the like.

In accordance with some embodiments of the present disclosure, an exemplary method of adjusting a ride height of a harvester is provided. The method includes providing a harvester including a vehicle frame configured for attachment to an implement to be moved in a longitudinal working direction across the ground. The harvester includes at least one rear axle positioned transversely to the longitudinal working direction of the harvester and operably attached to the vehicle frame. The harvester includes first and second casters pivotally mounted to the rear axle. In some embodiments, the harvester includes first and second hydraulic actuators. In some embodiments, the first and second hydraulic actuators are in fluid communication with at least one hydraulic circuit, and operably mounted to the rear axle. The harvester includes a sensor (e.g., a position sensor). The method includes detecting a ride height of the harvester with the sensor. The method includes adjusting extension or retraction of at least one of the first and second hydraulic actuators based on the detected ride height of the harvester to adjust the ride height in one or more operable modes. In some embodiments, the method includes providing information to an operator via an operator interface about a ride height status of the harvester.

In accordance with some embodiments of the present disclosure, an exemplary ride height adjustment system configured for operation on a harvester including at least one axle is provided. The ride adjustment system includes at least one caster pivotally mounted to the axle. The ride adjustment system includes at least one sensor configured to detect a ride height of the harvester. The ride adjustment system includes at least one hydraulic actuator in fluid communication with at least one hydraulic circuit, operably mounted to the axle, and configured for adjusting the ride height of the harvester during operation of the harvester in one or more operable modes.

In some embodiments, the ride adjustment system includes one rear axle positioned transversely to a longitudinal working direction of the harvester and configured for attachment to a frame of the harvester. The ride adjustment system includes a right-hand and a left-hand rear axle positioned transversely to a longitudinal working direction of the harvester and each configured for attachment to a frame of the harvester. The ride adjustment system includes a hydraulic valve manifold, an accumulator in fluid communication with the first and second hydraulic actuators via the hydraulic valve manifold, a pump in fluid communication with the hydraulic valve manifold, and a tank in fluid communication with the hydraulic valve manifold.

In accordance with some embodiments of the present disclosure, an exemplary kit is provided. The kit includes at least one sensor configured to detect a ride height of a harvester. The kit includes at least one hydraulic actuator configured for being mounted to the axle of the harvester and configured to adjust the ride height of the harvester during operation of the harvester in one or more operable modes. The kit includes at least one hydraulic circuit including a hydraulic circuit manifold. The hydraulic circuit manifold and the at least one hydraulic actuator are configured for fluid communication with each other and a hydraulic circuit in the harvester.

In some embodiments, the kit includes a software program product that is configured for use with a software system of the harvester and includes executable code that executes transition of the hydraulic circuit between a first hydraulic state, a second hydraulic state, and a third hydraulic state. The first hydraulic state includes preventing pressurized fluid from flowing in or out of the at least one hydraulic actuator to maintain a closed configuration of the hydraulic circuit. The second hydraulic state includes diverting pressurized fluid from a pump to the at least one hydraulic actuator to extend the at least one hydraulic actuator and raise the ride height of the harvester, or diverting pressurized fluid from the at least one hydraulic actuator to a tank to retract the at least one hydraulic actuator and lower the ride height of the harvester. The third hydraulic state includes diverting pressurized fluid in the hydraulic circuit to position an accumulator in a closed configuration and extending the at least one hydraulic actuator to a predetermined height.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed ride height adjustment system, reference is made to the accompanying figures, wherein.

DETAILED DESCRIPTION

Figure 1:
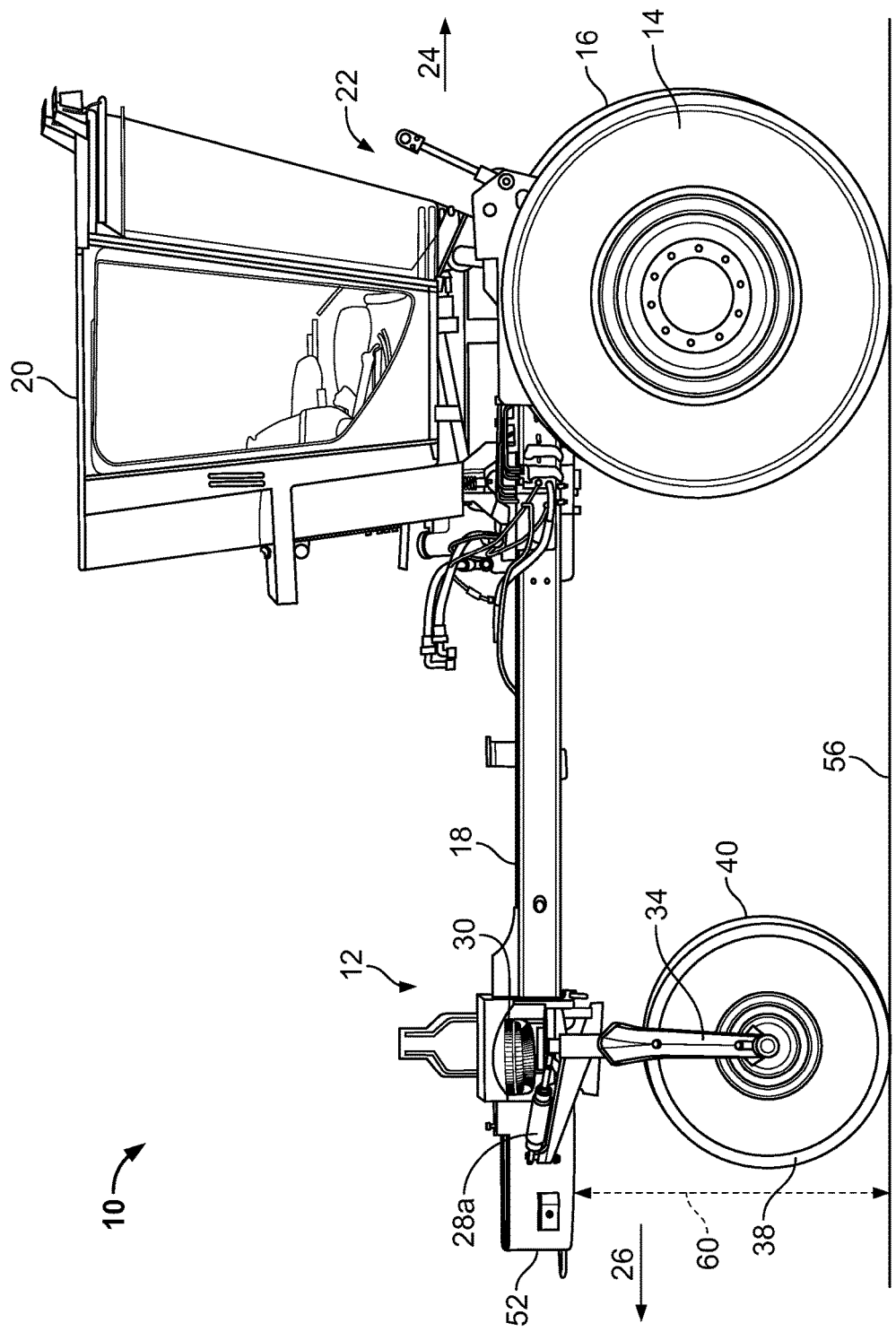
FIG. 1 is a side view of a conventional windrower including a rear suspension system.
Figure 2:
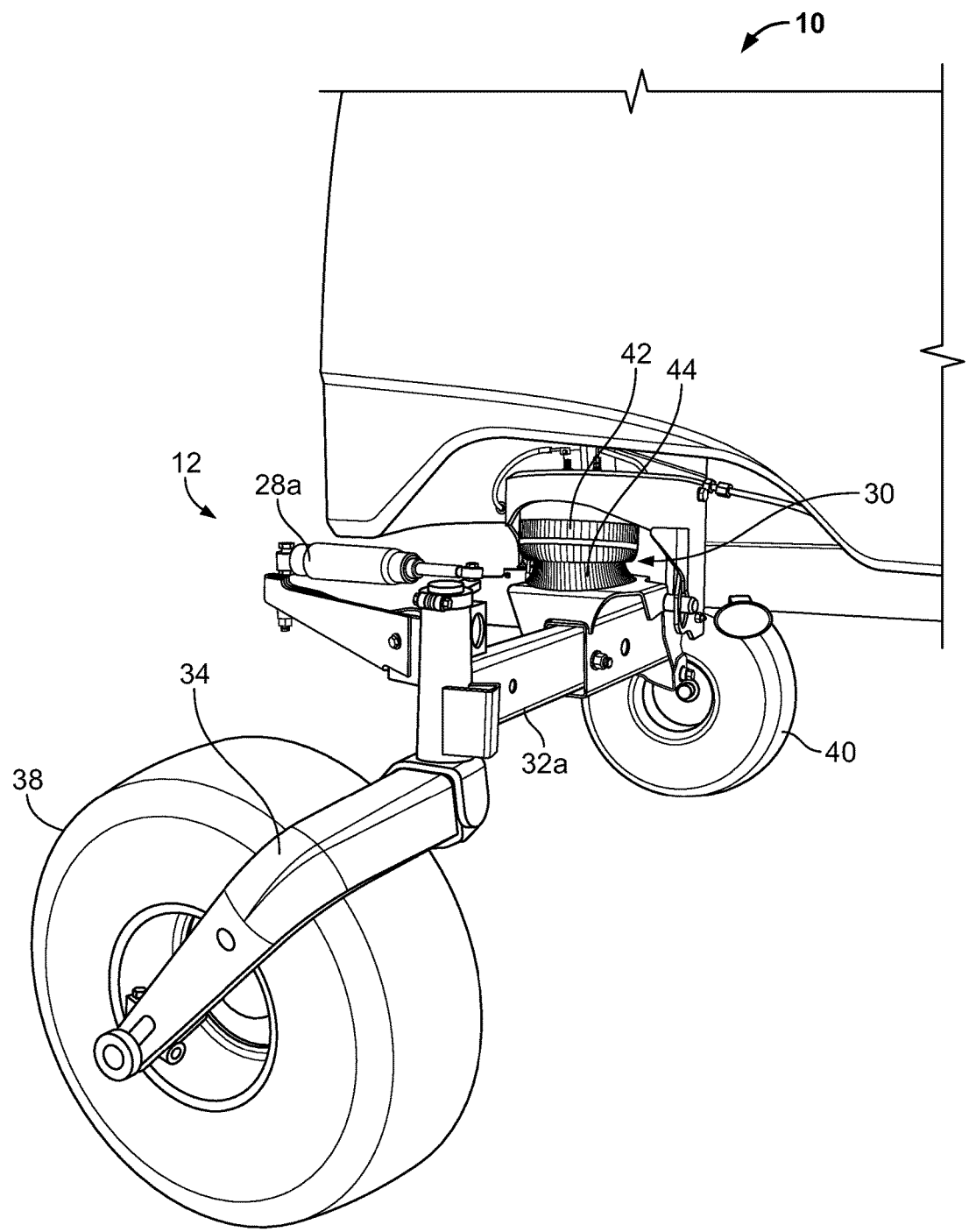
FIG. 2 is a detailed view of a rear suspension system of a conventional windrower.
Figure 3:
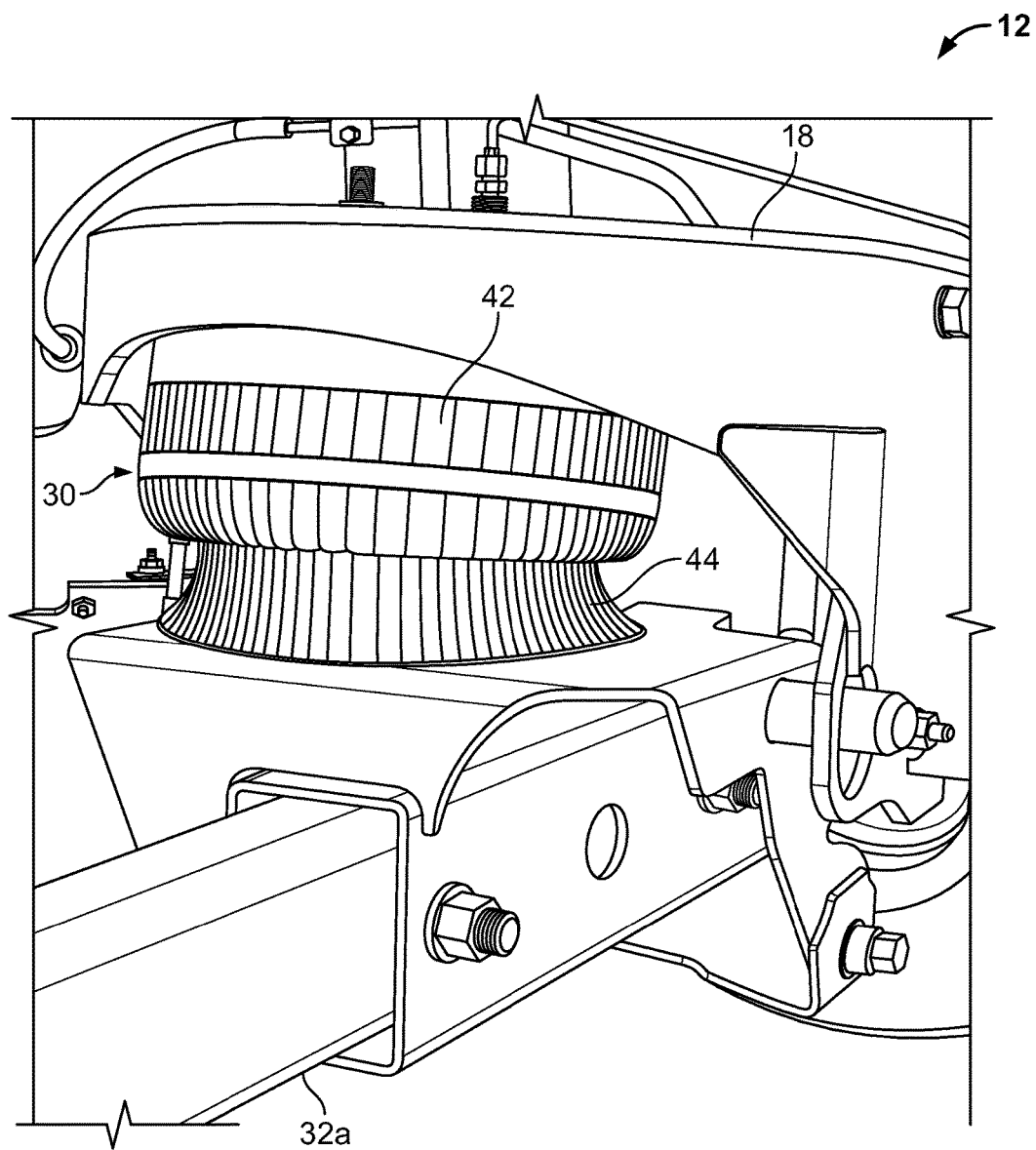
FIG. 3 is a detailed view of a rear suspension system of a conventional windrower.
Figure 4:
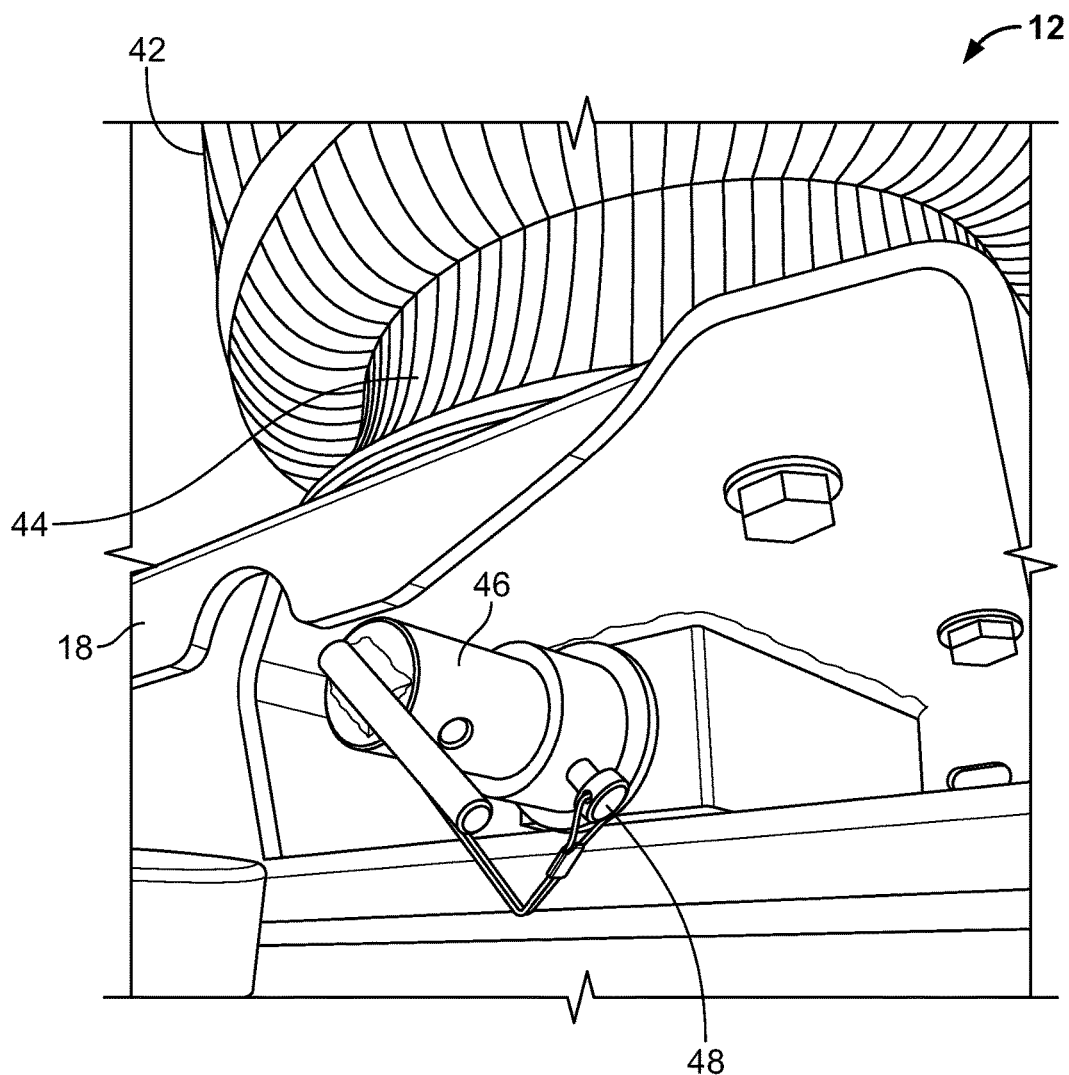
FIG. 4 is a detailed view of a rear suspension system of a conventional windrower with a lockout pin in an extended position.
Figure 5:
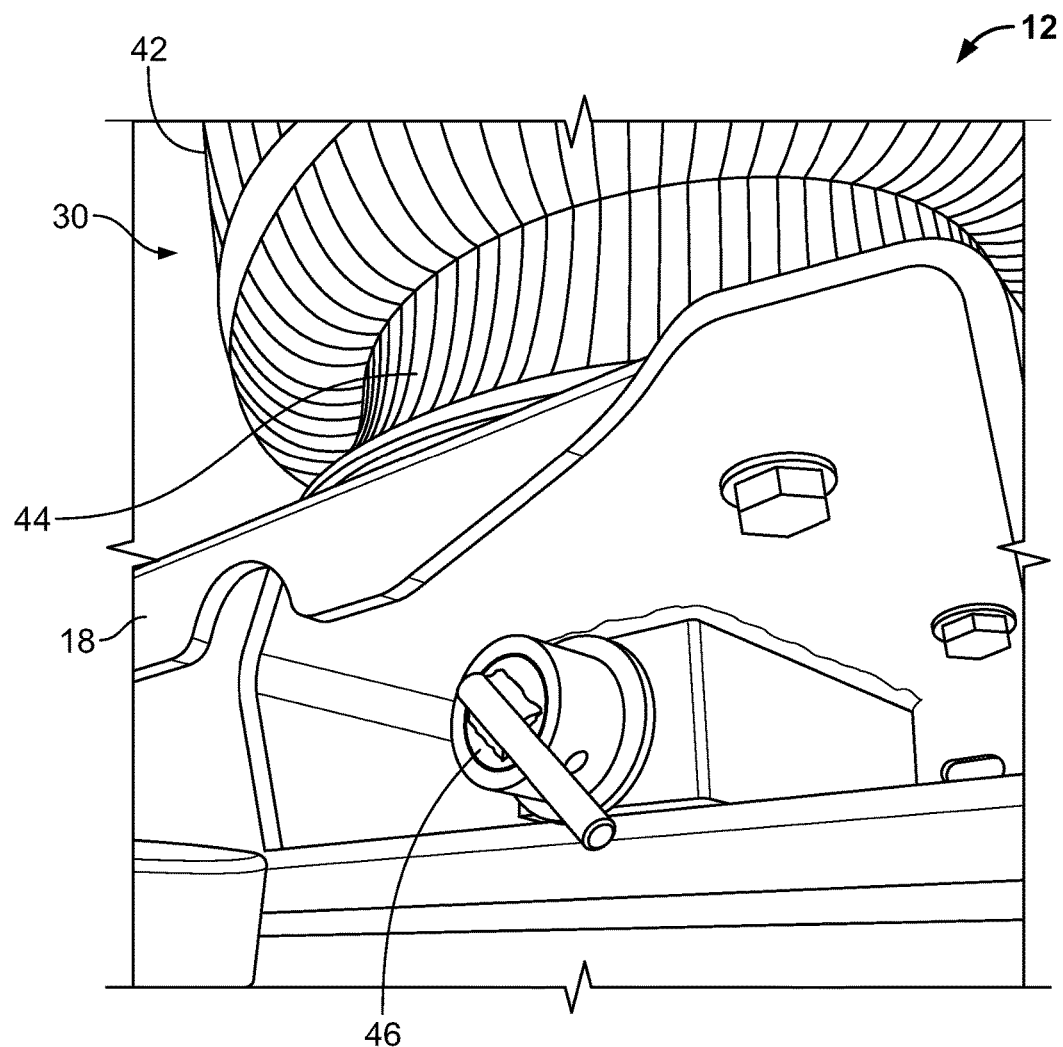
FIG. 5 is a detailed view of a rear suspension system of a conventional windrower with a lockout pin in an inserted position.
Figure 6:
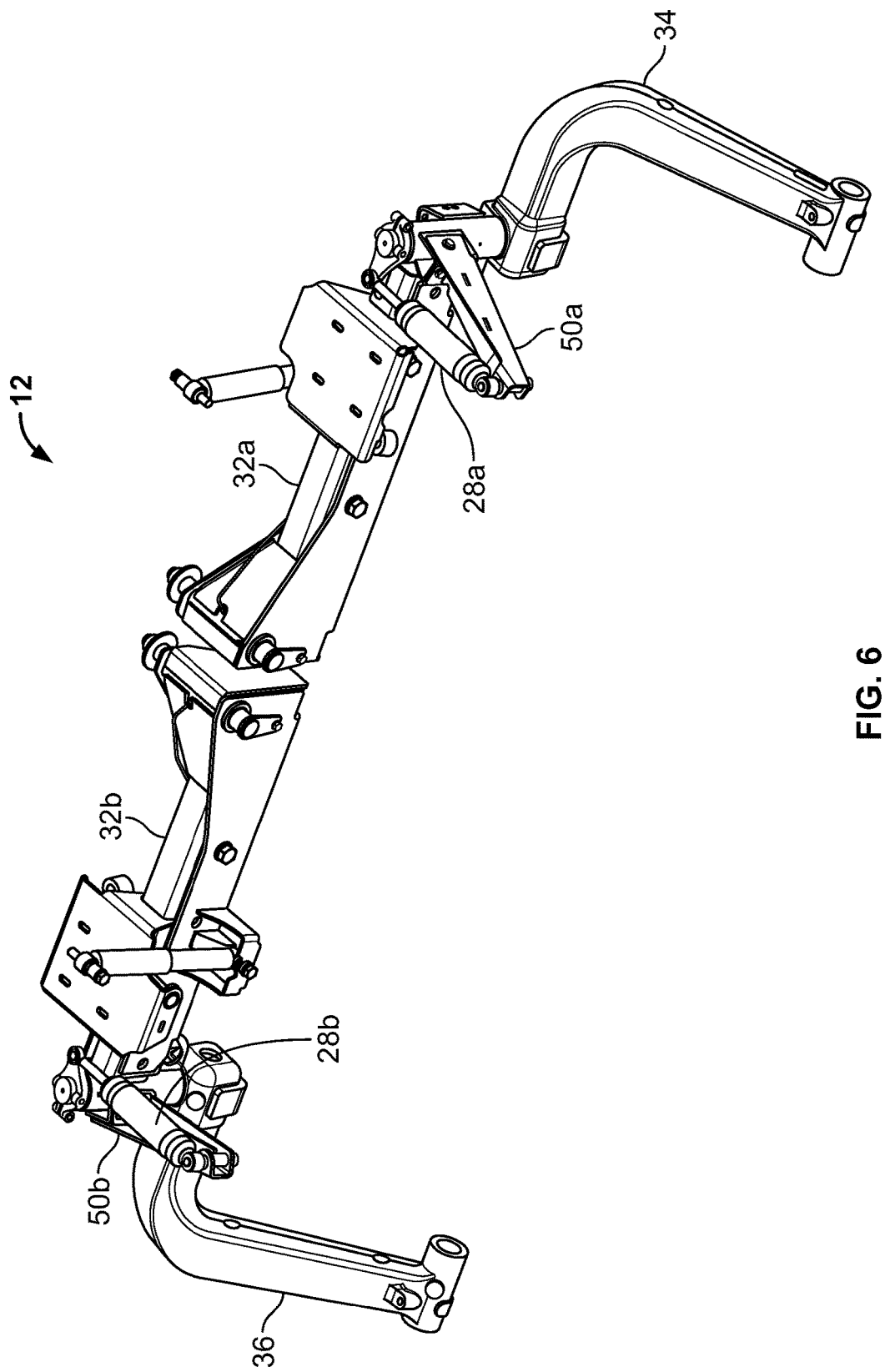
FIG. 6 is a perspective view of a conventional rear suspension system designed for a windrower.
Figure 7:
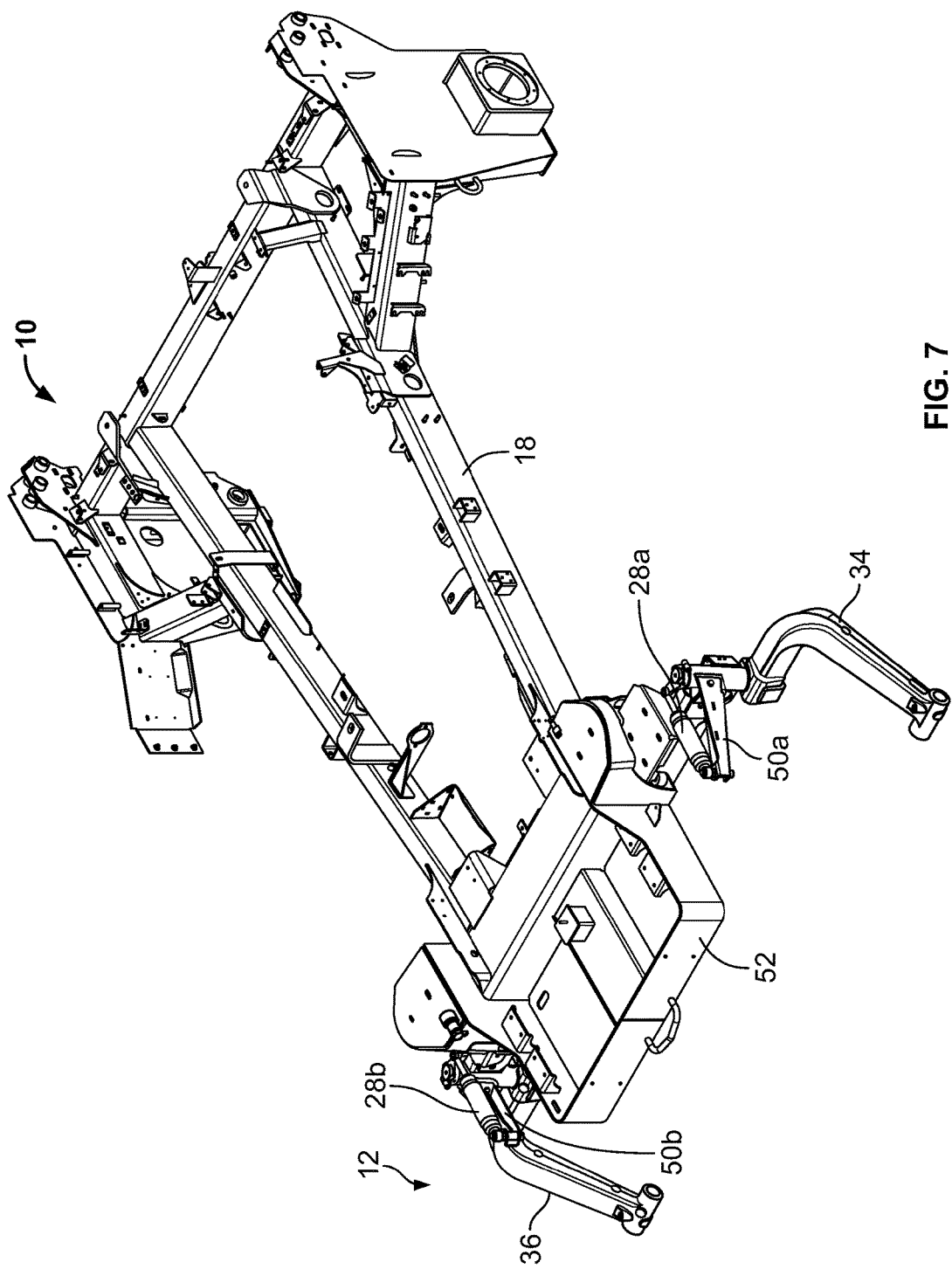
FIG. 7 is a perspective view of a convention rear suspension system attached to a frame of a windrower.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "damper" as used herein is defined as any device that deadens vibrations or movement of a mechanical component or assembly.

The term "height adjustor" as used herein is defined as any device that adjusts a height of a mechanical component or assembly.

The term "suspension system" as used herein is defined as an assembly or mechanical arrangement that cushions the ride of a harvester. In some embodiments, the suspension system includes hydraulic cylinders or actuators including pressurized fluid inlet and/or outlet and one or a plurality of fluid lines in fluid communication with a pressurized fluid reservoir. The disclosure generally relates to a rear suspension system designed for a harvester. In some embodiments, the harvester is a self-propelled windrower. In some embodiments, the suspension system is free of a fixed spring shock absorber.

The term "information" as used herein is defined as data values attributed to parameters. In some embodiments, information is digital and/or analog information. In some embodiments, information is the current operable mode of the harvester. In some embodiments, information is the detected ride height of the harvester or the detected position (e.g., magnitude of extension or retraction) of the hydraulic actuators. In some embodiments, warning information can be audio and/or visual information. In some embodiments, information includes whether the casters operably linked to an axle are moving during operation of the harvester in one or a plurality of operable modes. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or harvester. In some embodiments, the harvester includes a software system with executable code that executes different hydraulic states based on operator selection of forward or rearward direction of travel and/or the ride height of the harvester. In some embodiments, the disclosure also relates to a computer software product with executable code that automatically toggles between or through different hydraulic states based on operator selection of forward or rearward direction of travel and/or the ride height of the harvester. In some embodiments, the disclosure relates to the above-identified software and at least one or more suspension systems including at least one hydraulic cylinder and at least one position sensor operably connected to a hydraulic circuit configured for retrofitting the suspension system to the caster shock absorbing system of a previously purchased or leased harvester. The software program product may be on any medium or a component of a system optionally configured for update or install into the software of an existing harvester.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about the ride height at the rear end of the harvester around when the harvester should transition between different hydraulic states. In some embodiments, the software program product may be manually set or set for manual transition or automatic transition depending upon the detected ride height of the harvester. In some embodiments, the system includes one or a plurality of position sensors to detect the ride height of the harvester, and to detect the extension or retraction of each hydraulic actuator. The sensors may be hard wired to one or more wires creating a physical connection to one or a plurality of controllers and/or are active sensors can be activated and used over a WiFi hotspot, Bluetooth® or other internet connection with controllers capable of receiving such remote signals.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the ride height of the harvester. The system may process this information, optionally store it and then execute code to transition the hydraulic circuit between different hydraulic states. In some embodiments, the system may be configured by the operator to transition the harvester between different hydraulic states in synchrony or substantial synchrony to operator-initiated transition from a mounted header to removal of the header. In some embodiments, the data processing system of the harvester transitions the harvester between different hydraulic states in synchrony or substantial synchrony to operator-initiated transition from a mounted header to removal of the header. In some embodiments, the data processing system of the harvester transitions the harvester between different hydraulic states in synchrony or substantial synchrony to operator-initiated transition from a mounted header to removal of the header depending upon real-time information sent to a controller by a sensor that monitors the real-time ride height and/or extension or retraction of the hydraulic actuators in electronic communication with the data processing system.

The term "real-time" and the phrase "in real-time" as used herein are defined as a way of describing a process, event, or action that occurs simultaneously with the process of actively operating a harvester. In some embodiments, various sensors, for example a position sensor, continuously sense information about the ride height of the harvester and transmit that information to a controller in real-time. In some embodiments, an operator may adjust values or thresholds for one or more hydraulic states in real-time through the operator interface by accessing the system electronically and inputting one or a plurality of values.

In some embodiments, the system or harvester of the disclosure includes one or more position sensors. As disclosed in the above paragraph, changes in the ride height and/or the magnitude of extension or retraction of the hydraulic actuators can trigger transition between different hydraulic states. Particularly, the detected ride height is used to determine the degree of lift and/or lowering of the rear end of the windrower to automatically adjust the ride height of the rear end during changes in operation. The tolerance for how much ride height differential is necessary to trigger the transition can be manually inputted by the operator of the data processing system including the one or more position sensors. In some embodiments, the determination of whether the ride height has reached the predetermined value is within the error range of the sensors and controllers involved in the determination. In some embodiments, the determination of whether the ride height has reached the predetermined value or reached a predetermined value with a certain amount of frequency is within ±10% of the predetermined position and frequency value. In some embodiments, an operator determines the predetermined ride height and/or frequency values. In some embodiments, a controller or other software program determines the predetermined ride height and/or frequency values. In some embodiments, an operator provides the predetermined ride height and/or frequency values via an operator interface that is in electronic communication with one or more controllers. In some embodiments, a combination of an operator and a controller or other software program determines the predetermined ride height and/or frequency values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. Embodiments of the present invention are particularly well suited, but in no way limited to, use with windrowers. The present invention may also find utility in agricultural harvesters including, for example, a non-self-propelled windrower, a forage harvester, and a lawn mower. Embodiments of the present disclosure are particularly well suited, but in no way limited to, use with any vehicle with a rear axle suspension system.

In some embodiments, the method is performed by a harvester comprising a crop supply chamber, a crop gating system, and one or more sensors. In some embodiments, the one or more sensors are capable of determining a range of information, including, but not limited to, one or a combination of: the size of a bale in the bale chamber (diameter and/or weight), the position of the tailgate, the position of the control arm, the position of the rear wall, and the position of the crop gating system. In some embodiments, the one or more sensors are in electronic communication with one or more controllers.

The disclosure provides exemplary rear suspension systems that can be used with a variety of axle systems, e.g., multi-link solid axle suspension, swing axle systems, solid axle suspension, independent upper-lower control arm suspension, or the like, without affecting the essence of the rear suspension system. It should be understood that the technology disclosed herein can be incorporated into or used in combination with a variety of hydraulic damping or suspension systems, such as, e.g., U.S. patent application Ser. No. 15/395,806, filed on Dec. 30, 3016; and U.S. patent application entitled "Position-Based Hydraulic Leveling System and Methods of Using the Same", CNHi Ref. 52560, filed on Feb. 10, 2017, the entire contents of which are incorporated herein by reference. The position/height-based rear suspension eliminates the need for lockout pins and shock absorbers, allowing the operator to select a desired ride height based on operating conditions.

Rather than conventional air bags or shock absorbers, hydraulic cylinders or actuators (one per axle) are used. For a rear suspension system, the left-hand and right-hand side hydraulic actuators are hydraulically connected barrel end to barrel end, and rod end to rod end. Thus, a viscous damping force is provided in the system. The hydraulic line connecting the barrel ends of the hydraulic actuators is plumbed to a hydraulic accumulator. The accumulator provides the springing medium for the rear suspension. The accumulator has a gas charge adequate to provide suspension springing to the varied rear weights of all windrowers. Hydraulic pressure/flow is provided to the barrel ends of the hydraulic actuators and the accumulator by a pump (e.g., an engine driven pump). A dedicated suspension pump can be used, but a header lift system pump or steering pump can also be used.

Valving is provided to allow the system to extend the hydraulic actuators, retract the hydraulic actuators, charge the accumulator, and discharge the accumulator, depending on the mode of operation. In one embodiment, an additional master valve is provided that allows a pump from another function (e.g., lift, steering, or the like) to be used for suspension control. Although shows as plumbed to tank, the rod ends of the hydraulic actuators can be plumbed either to tank or to charge pressure (pump). A valve is provided between the rod ends of the hydraulic actuators and the tank/charge to allow flow out of the rod ends of the hydraulic actuators (upon extension of the hydraulic actuators) to be stopped or slowed. A check valve is provided to allow flow back into the rod ends of the hydraulic actuators (when the hydraulic actuators are retracting) around the valve.

Sensors provide suspension position data and/or ride height data to the controller. The ride height data can be provided via any form of suspension position sensing, e.g., rotational potentiometers on the suspension links/arms, internal cylinder linear sensors (LVDT linear sensors), or any form of mechanism coupled to the hydraulic actuators and/or suspension members which can output an electronic signal to the controller.

The system monitors and maintains the desired ride height during operation, providing constant rear ride height throughout a full day's operation. Should rear caster geometry be such that the rear ride height of the windrower would raise or lower when reversing, the system can actively raise or lower the rear suspension ride height in order to maintain a constant frame angle. In the case of a solid axle suspension, a single central hydraulic actuator can be used in place of the two hydraulic actuators on the left-hand and right-hand sides, respectively, while maintaining the same control of the ride height. Although individual directional valves are disclosed, such valves can be replaced with any number of 2, 3, 4, I-way valves without affecting the essence of the disclosure. Although a single accumulator is disclosed, any number of accumulators can be used in order to achieve the same effect.

Thus, the active hydraulic suspension for the windrower uses feedback of the rear suspension position to determine and set ride height with the hydraulic actuators plumbed to an accumulator. The hydraulic rear suspension for the rear axle couples the barrel ends of the hydraulic actuators together, and couples the rod ends of the hydraulic actuators together, in order to provide axle articulation during operation. In some embodiments, a droop valve can be used to limit axle droop during episodes of rapid deceleration in order to accommodate extra travel and/or articulation of the rear axle suspension for normal, in-field operation. The hydraulic rear suspension system is able to lockout to a predetermined height during a header removal mode for the purpose of maintaining the rear ride height while the header is removed from the front of the windrower and excess weight has been transferred to the rear axle.

Figure 8:
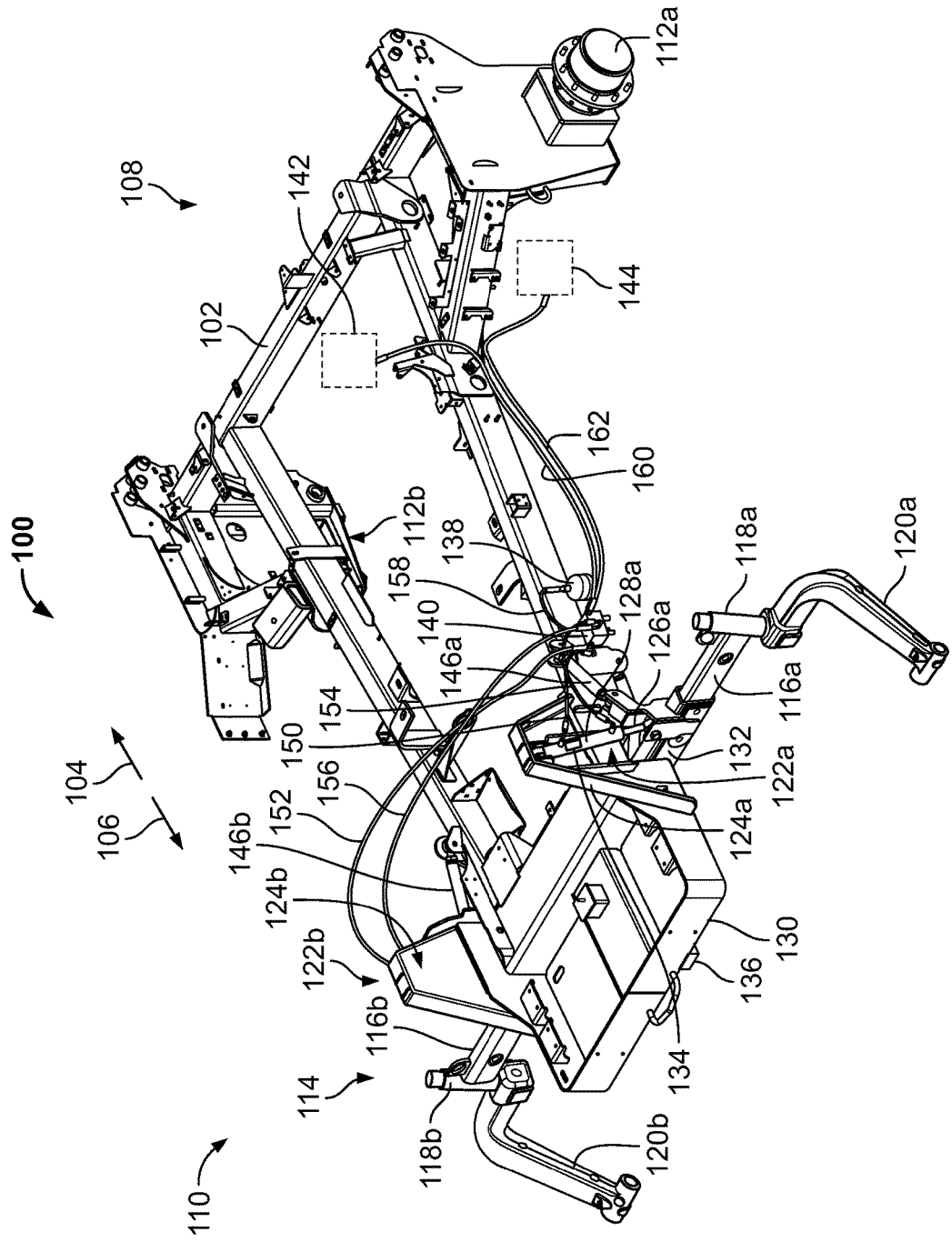
FIG. 8 is a rear, perspective view of an exemplary rear suspension system attached to a frame of a windrower.
Figure 9:
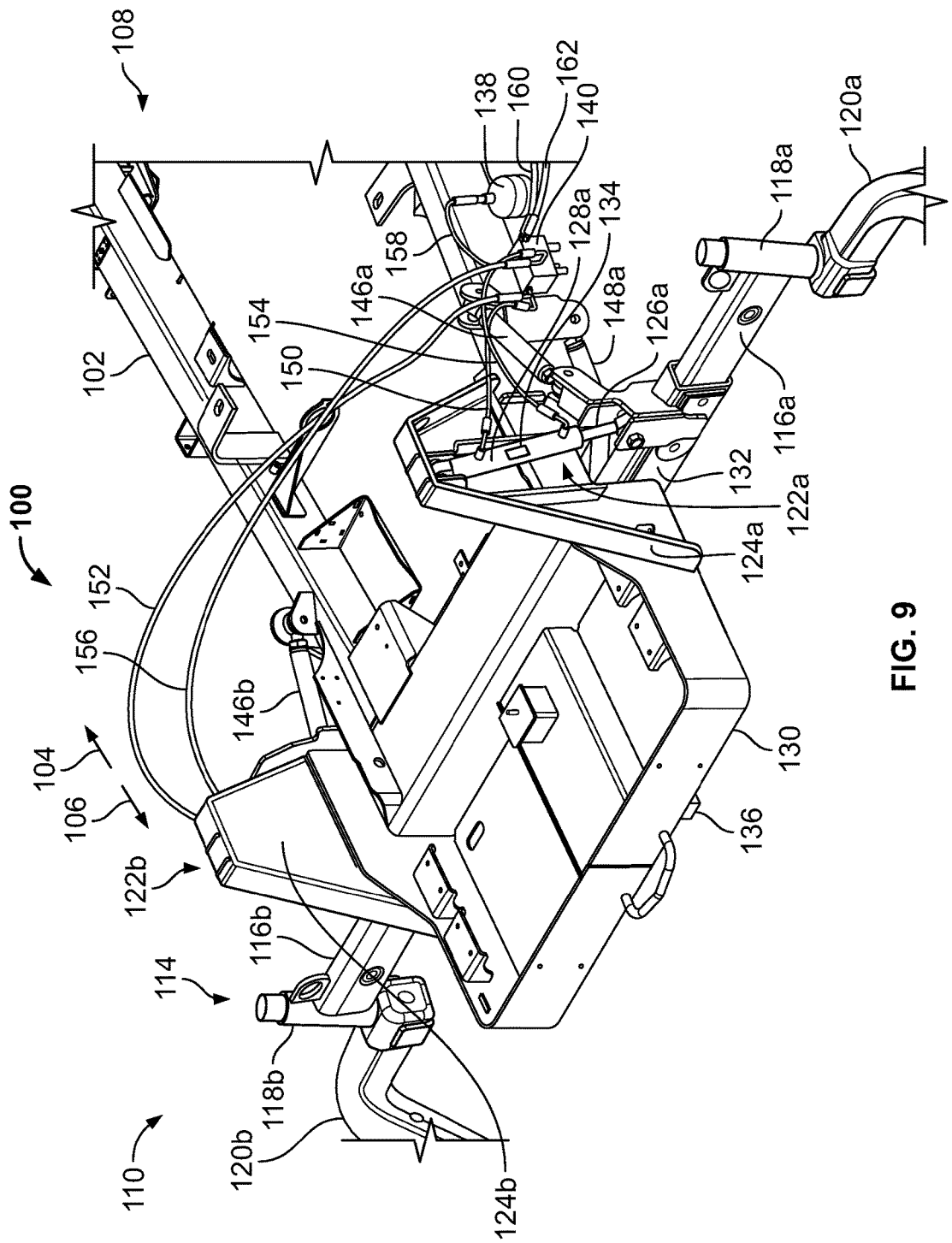
FIG. 9 is a rear, perspective and detailed view of an exemplary rear suspension system attached to a frame of a windrower.
Figure 10:
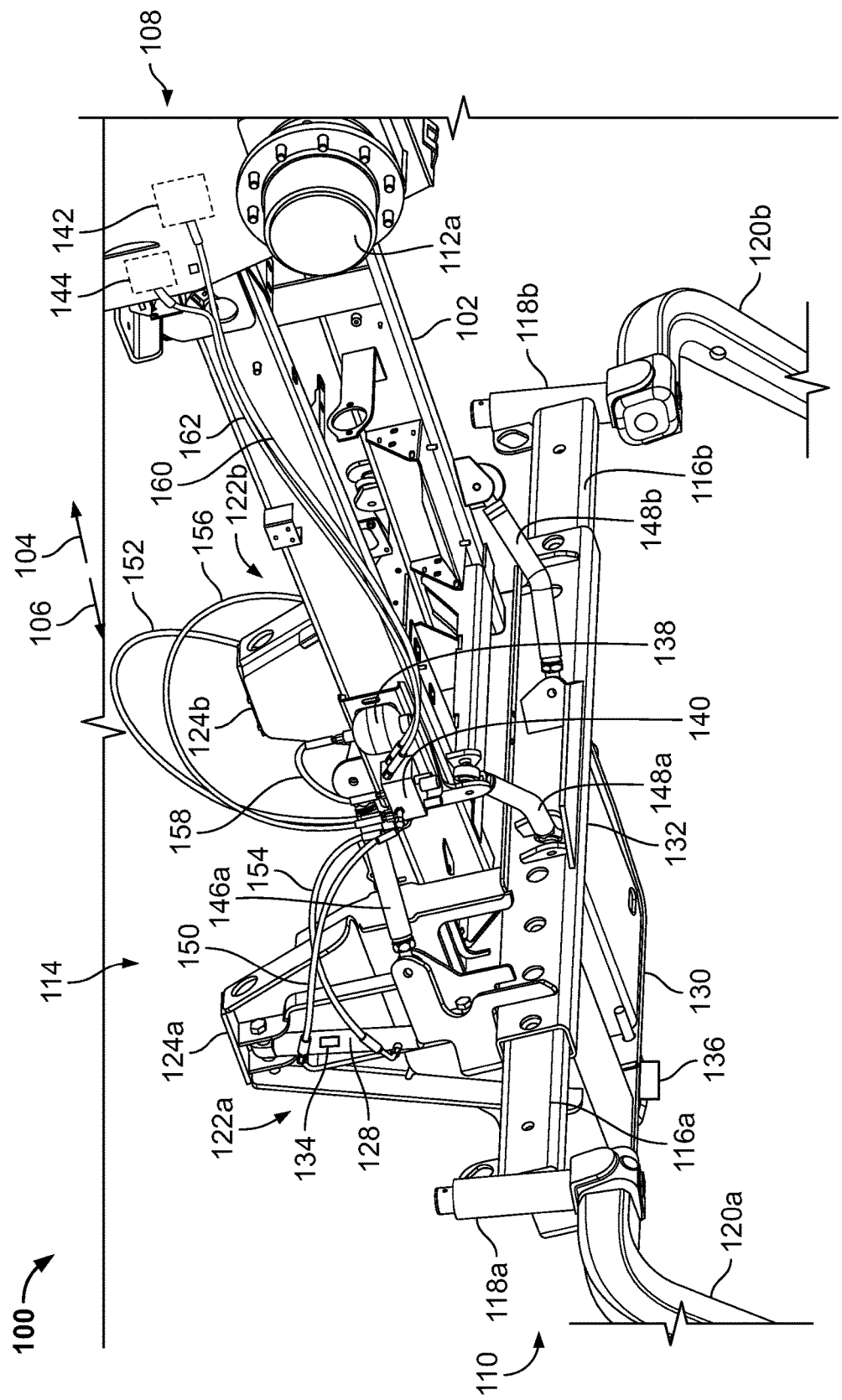
FIG. 10 is a bottom, perspective view of an exemplary rear suspension system attached to a frame of a windrower.

FIGS. 8-10 show rear and front perspective views of an exemplary harvester 100 of the present disclosure with components omitted for clarity. The harvester 100 includes a frame 102 (e.g., a vehicle frame) configured for attachment to an implement (e.g., a header) to be moved in a longitudinal working direction (e.g., a forward direction 104 and a reverse direction 106) across the ground. The harvester 100 includes a proximal or front end 108 and a distal or rear end 110. The front end 108 of the harvester 100 includes first and second axles 112a, 112b configured to rotatably receive front wheels on either side of the harvester 100. Generally, the front wheels do not have a suspension system. The harvester 100 includes a ballast box 130 mounted to a rear edge 132 of the frame 102.

The harvester 100 includes a rear suspension system 114 with rear axles 116a, 116b operably mounted to the frame 102 and positioned transversely to the longitudinal working direction of the harvester 100. The rear axles 116a, 116b are operably mounted to the frame 102 at one end and include connection points 118a, 118b on opposing ends (e.g., the outermost ends of the rear axles 116a, 116b). The rear suspensions system 114 includes first and second casters 120a, 120b pivotally mounted to the respective rear axles 116a 116b at a bottom end of the connection points 118a, 118b such that the casters 120a, 120b can pivot 360 degrees at the connection points 118a, 118b. The casters 120a, 120b are configured to rotatably receive caster wheels (e.g., wheels 38, 40 of FIG. 1).

The rear suspension system 114 includes a first hydraulic cylinder or actuator 122a operably mounted to the rear axle 116a via a mounting bracket 124a. Based on the detected ride height and/or magnitude of extension/retraction of the hydraulic actuator 122a, the hydraulic actuator 122a is configured to adjust the extension or retraction of a rod 126a from a barrel 128a of the hydraulic actuator 122a to adjust the ride height of the frame 102 relative to the ground on the right-hand side of the harvester 100. The rear suspension system 114 includes a second hydraulic cylinder or actuator 122b operably mounted to the rear axle 116b via a mounting bracket 124b. Based on the detected ride height and/or magnitude of extension/retraction of the hydraulic actuator 122b, the hydraulic actuator 122b is configured to adjust the extension or retraction of a rod from a barrel of the hydraulic actuator 122b to adjust the ride height of the frame 102 relative to the ground on the left-hand side of the harvester 100.

Detection of the ride height and/or extension/retraction of the hydraulic actuators 122a, 122b can be performed by a plurality of sensors (e.g., sensors 134 disposed within the barrels of the hydraulic actuators 122a, 122b, sensors 136 disposed on the frame 102 and/or the ballast box 130 to detect the height of the frame 102 relative to the ground, combinations thereof, or the like). In some embodiments, sensors (e.g., potentiometers) can be mounted at any one of the pivots of the radius rods 146a, 146b, 148a, 148b. In some embodiments, a separate control arm can be acted upon by a radius rod 146a, 146b, 148a, 148b at some point along its length, and the control arm can be coupled to a sensor (e.g., a potentiometer). In some embodiments, the sensor 134 can be a positional sensor or a rotational potentiometer configured to detect the rotational position of the linkages of the hydraulic actuators 122a, 122b. In some embodiments, the sensor 134 can be a linear sensor internal to the hydraulic actuators 122a, 122b. Thus, the hydraulic actuators 122a, 122b are configured to adjust the ride height of the harvester 100 (e.g., height 60 in FIG. 1) on one or both sides of the harvester 100 in one or more operable modes.

The rear suspension system 114 includes one or more accumulators 138 mounted to the frame 102 and in fluid communication with the hydraulic actuators 122a, 122b. The rear suspension system 114 includes a hydraulic valve manifold 140 mounted to the frame 102 and in fluid communication with a pump 142 and a tank 144. The position of the pump 142 and tank 144 is only for illustrative purposes, and it should be understood that the pump 142 and/or tank 144 can be located anywhere in the harvester 100.

The harvester 100 can include radius rods 146a, 146b pivotally mounted to both the frame 102 and the rear axles 116a, 116b. The radius rods 146a, 146b provide additional support to the rear axles 116a, 116b during extension and retraction of the hydraulic actuators 122a, 122b. The harvester 100 can include radius rods 148a, 148b pivotally mounted to the rear end 110 of the frame 102 and a midpoint or portion of the frame 102 spaced from the rear end 110. The radius rods 148a, 148b also provide additional support to the rear axles 116a, 116b during extension and retraction of the hydraulic actuators 122a, 122b.

The rear suspension system 114 includes hydraulic lines 150, 152 that fluidically connect the barrels of the respective hydraulic actuators 122a, 122b with each other via the hydraulic valve manifold 140. The rear suspension system 114 includes hydraulic lines 154, 156 that fluidically connect the rod ends of the respective hydraulic actuators 122a, 122b with each other via the hydraulic valve manifold 140. The rear suspension system 114 includes a hydraulic line 158 that fluidically connects the hydraulic valve manifold 140 with the accumulator 138. The rear suspension system 114 includes hydraulic lines 160, 162 that fluidically connect the hydraulic valve manifold 140 with the pump 142 and tank 144.

In operation, the hydraulic actuators 122a, 122b are arranged such that the rear end 110 of the windrower 100 is suspended (e.g., held up) by either the barrel or rod end of the hydraulic actuator 122a, 122b. Thus, although the figures show the barrel end holding up the rear end 110 of the windrower 100, in some embodiments, the rod end can perform the same function. The accumulator 138 is plumbed to the barrel end of the hydraulic actuators 122a, 122b, providing the springing medium. A predetermined ride height "h" is input to the controller either as a factory default setting/selection or an operator input value.

When the windrower 100 is started, the controller assesses the current ride height based on the average of the suspension position sensors with the header raised. If the average does not meet the predetermined height "h", the system 114 either adds pressurized fluid to the barrel end using a pump 142 or bleeds the pressurized fluid off from the barrel end to tank 144. Averaging the value of the sensors enables the ride height to be set when the windrower 100 is not on perfectly level ground, as the coupling of the barrel ends of the hydraulic actuators 122a, 122b ensures that the average height will provide constant ride height when on level ground. In one embodiment, the ride height "h" can be at a position where the hydraulic actuators 122a, 122b are at an intermediate extension (e.g., approximately 50%), neither completely extended nor completely retracted.

The function of the system 114 changes based on various operating conditions. One operating condition is normal operation (e.g., along flat, level ground). The suspension circuit is configured as a closed circuit, where pressurized fluid can flow into and out of the barrel end of the hydraulic actuators 122a, 122b or into and out of the accumulator 138, the accumulator 138 displacing the charged fluid/gas and providing the spring action. Pressurized fluid can flow from the barrel end of one hydraulic actuator 122a to the other 122b (e.g., when the windrower 100 drives over an obstacle with only one rear wheel). On the rod end, pressurized fluid is free to flow into and out of the hydraulic actuators 122a, 122b, and to cross-flow between the rod ends.

In some embodiments, another operating condition is ride height adjustment operation. To raise the rear end 110 of the windrower 100, pressure/flow from the pump 142 is directed into the barrel end circuit, extending the hydraulic actuators 122a, 122b (simultaneously or independently) and charging the accumulator 138. When the rear end 110 of the windrower 100 needs to be lowered due to expansion from heat build-up or when switching to a lighter header, the suspension dump valve and/or accumulator dump valve is open to tank 144, allowing pressurized fluid to flow out of the hydraulic actuators 122a, 122b and accumulator 138, thereby lowering the rear end 110 of the windrower 100.

In some embodiments, another operating condition is header removal mode operation. During header removal, the weight removed from the front end 108 of the windrower 100 causes excessive weight to be transferred to the rear axle 116a, 116b of the windrower 100, making the rear end 110 of the windrower 100 squat excessively and causing the lift arms for connecting to the header to rise (often too high to properly detach a header). To eliminate this issue, the accumulator master valve is closed and the hydraulic actuators 122a, 122b are extended to a predetermined height "h2" which may or may not be the same as normal operation height "h". In this configuration, pressurized fluid is trapped in the barrel ends of the hydraulic actuators 122a, 122b and allowed only to flow between the barrel ends. This allows the rear axle 116a, 116b to pivot about a central axis (or axes depending on the suspension design) while moving the windrower 100 during header removal. This eliminates the tendency for excess torsional forces to be introduced to the frame 102 from locking the axles 116a, 116b rigidly to the frame 102 (as occurs in conventional suspension systems). The accumulator 138 can be introduced to the barrel end circuit during this activity should there be a desire to maintain springing action (e.g., if there is a desire to tow a header behind the windrower 100 without a header mounted to the front end 108). In such instances, the accumulator 138 would perform similarly to the ride height adjustment operation described above.

Another operating condition is rapid deceleration operation. During episodes of rapid deceleration, it is desirable to limit the down-travel of the suspension, as this results in excessive rear end 110 lift of the windrower 100 until the unsprung weight of the axle(s) 116a, 116b is picked up by the rear end 110 of the windrower 100 at the limit of down-travel (droop). The system 114 can sense rapid deceleration either by the "Forward", "Neutral" or "Reverse" lever (FNR) position as set by the operator or by the rate of change of extension of the hydraulic actuators 122a, 122b, and closes the droop valve which prevents the hydraulic actuators 122a, 122b from further extension. Such action prevents excessive nose-dive during episodes of rapid deceleration while still allowing a large amount of wheel travel, which is desirable when driving over very uneven ground (e.g., through ruts). A check valve is provided to allow flow back into the rod end circuit around the droop valve to avoid having a locked suspension should the rear wheels encounter a bump during the deceleration episode, requiring additional suspension compression. In some embodiments, the disclosure relates to a method of operating a harvester in any one of the operating conditions without a step of reversing the harvester vehicle direction for any distance prior to moving forward in the one or plurality of conditions. In particular, in some embodiments, the disclosure relates to a method of operating a harvester free of backward movement of the harvester when transitioning the harvester from one operational mode to another operational mode.

In some embodiments, another operating condition can be a reversing mode of the windrower 100. In such condition, the droop limiting valve can be activated as the rear of the windrower 100 tends to lift until the unsprung weight is picked up by the suspension. Thus, actions similar to those performed during the rapid deceleration operation can be performed to avoid a nosedive.

Another operating condition is service mode operation. In such operation, all valves are open to tank 144, allowing the hydraulic actuators 122a, 122b to retract fully. Full retraction of the hydraulic actuators 122a, 122b causes the windrower 100 to settle down on the rear axle 116a, 116b bump stops. In such operation, maintenance on the windrower 100 can be performed.

Figure 11:
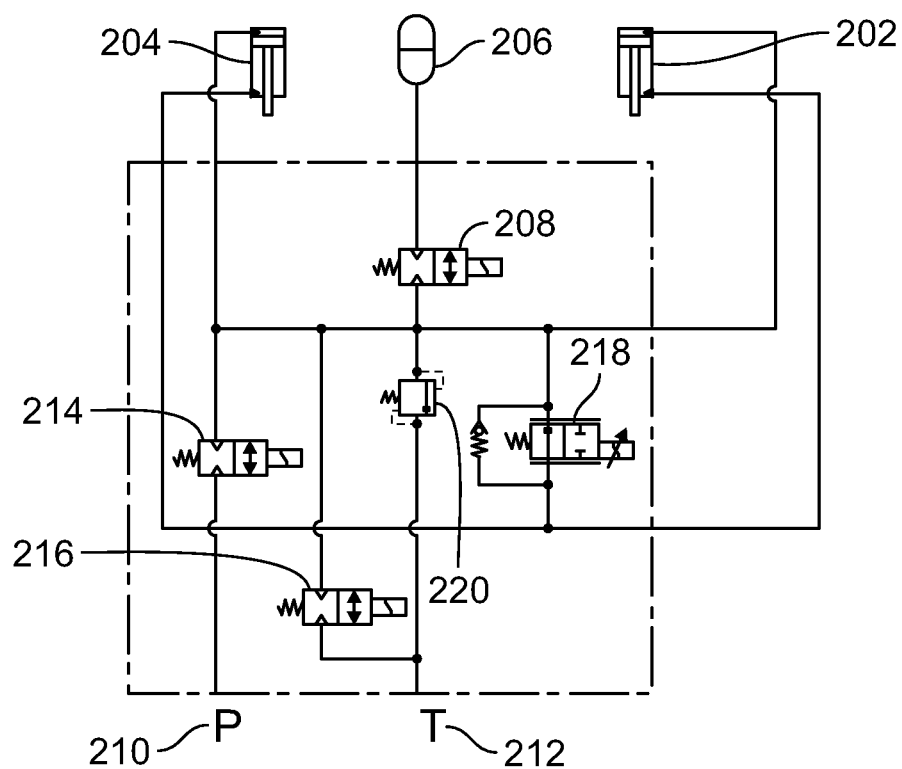
FIG. 11 is a static image of a hydraulic circuit for an exemplary rear suspension system.

FIG. 11 is a static image of one embodiment of a hydraulic circuit 200 for the exemplary rear suspension system disclosed herein. The hydraulic circuit 200 includes a right-hand hydraulic actuator 202 in fluid communication with a left-hand hydraulic actuator 204. The hydraulic circuit 200 includes an accumulator 206 in fluid communication with the hydraulic actuators 202, 204. Although not shown, it should be understood that the hydraulic circuit 200 includes sensors (e.g., linear sensors or any type of suspension position sensor) configured to detect the extension/retraction of the hydraulic actuators 202, 204. The hydraulic circuit 200 includes an accumulator master valve 208 disposed between the accumulator 206 and the hydraulic actuators 202, 204. The hydraulic circuit 200 includes a pump 210 and a tank 212. The hydraulic circuit 200 includes a pressure control valve 214 disposed between the pump 210 and the remaining components of the hydraulic circuit 200. The hydraulic circuit 200 includes a return to tank control valve 216 disposed upstream of the tank 212. The hydraulic circuit 200 includes a droop limiting valve 218 and a relief valve 220.

Figure 12:
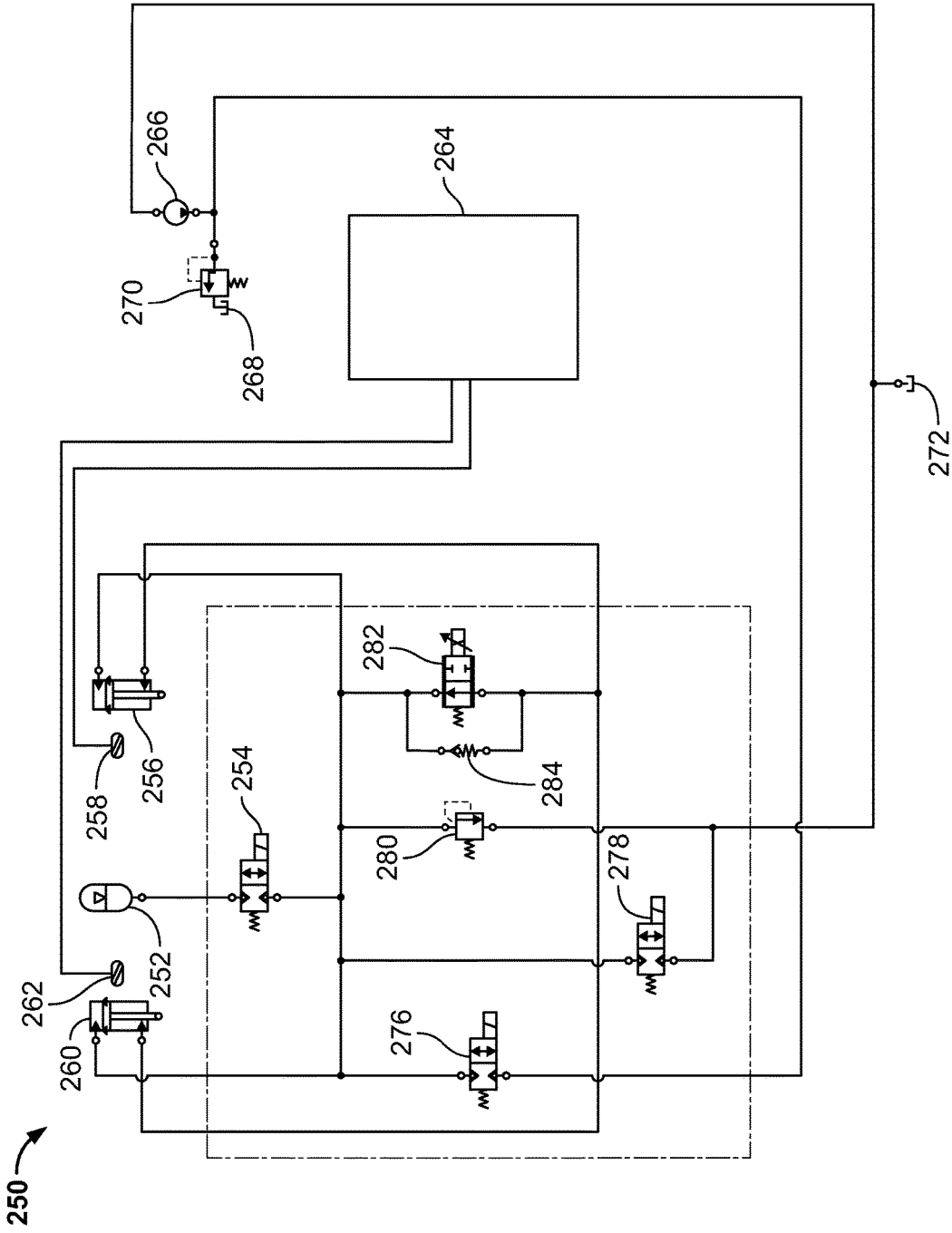
FIG. 12 is a static image of a hydraulic circuit for an exemplary rear suspension system.

FIG. 12 is a static image of another embodiment of a hydraulic circuit 250 for the exemplary rear suspension system disclosed herein. The hydraulic circuit 250 includes an accumulator 252 and an accumulator master valve 254 disposed upstream of the accumulator 252. The hydraulic circuit 250 includes a right-hand side hydraulic actuator 256 with a sensor 258 (e.g., a linear sensor or any type of suspension position sensor) configured to detect the extension/retraction of the hydraulic actuator 256. The hydraulic circuit 250 includes a left-hand side hydraulic actuator 260 with a sensor 262 (e.g., a linear sensor or any type of suspension position sensor) configured to detect the extension/retraction of the hydraulic actuator 260. The sensors 258, 262 are communicatively connected to a controller 264 such that the detected position of the hydraulic actuators 256, 262 can be transmitted to the controller 264.

The hydraulic circuit 250 includes a pump 266 in fluid communication with a pressurized fluid reservoir 268. A relief valve 270 is disposed between the pump 266 and reservoir 268. The hydraulic circuit 250 includes another pressurized fluid reservoir 272, a suspension lift valve 274, a master/pressure control valve 276, a dump valve 278, a relief valve 280, a droop limiting valve 282, and a droop limiting bypass check valve 284.

Figure 13:
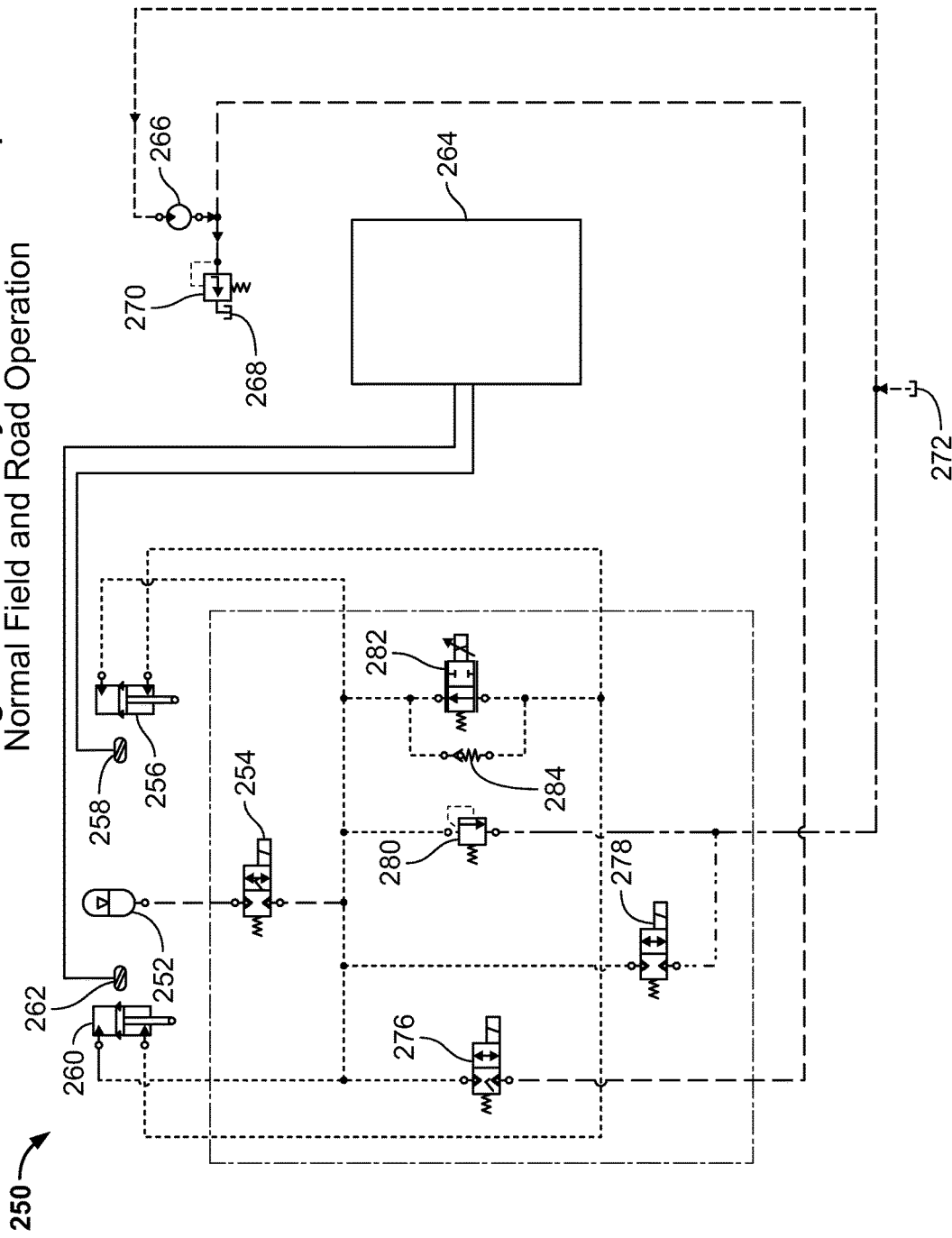
FIG. 13 is the hydraulic circuit of FIG. 12 in a normal field and road operation mode.

FIG. 13 is the hydraulic circuit 250 of FIG. 12 in a normal field and road operation mode. The hydraulic circuit 250 is closed such that pressurized fluid can flow between the hydraulic actuators 256, 260. The weight of the windrower is suspended by the hydraulic actuators 256, 260 and by the accumulator 252. The accumulator master valve 254 is actuated into an open position. The master/pressure control valve 276 is actuated into a closed position, the droop limiting valve 282 is actuated into an open position, and the dump valve 278 is actuated into a closed position. Flow is open between the hydraulic actuators 256, 260 and the accumulator 252 to provide suspension springing/damping. The check valve 284 allows flow to pass back around the droop limiting valve 282.

Figure 14:
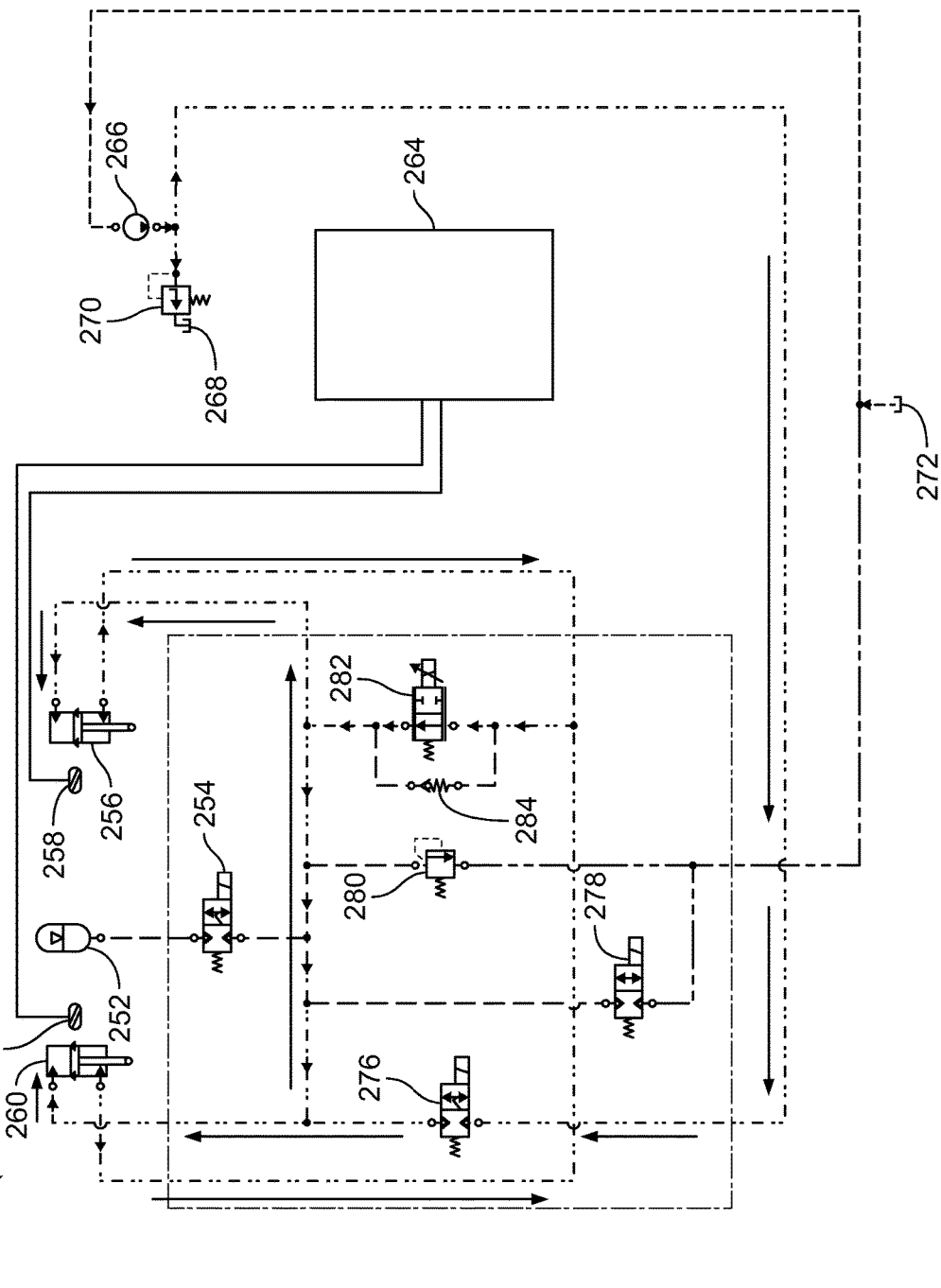
FIG. 14 is the hydraulic circuit of FIG. 12 in a ride height increase adjustment operation mode.

FIG. 14 is the hydraulic circuit 250 of FIG. 12 in a ride height increase adjustment operation mode. To raise the rear end of the windrower, pressure/flow from the pump 266 can be directed into the barrel ends of the hydraulic actuators 156, 160. The weight of the windrower is suspended by the hydraulic actuators 256, 260 and by the accumulator 252. The accumulator master valve 254 is actuated into an open position, the droop limiting valve 282 is actuated into an open position, and the dump valve 278 is actuated into a closed position. The master/pressure control valve 276 is actuated into an open position and allows flow from the pump 266 to extend the hydraulic actuators 256, 260, thereby raising the rear of the windrower. Flow is open between the hydraulic actuators 256, 260 and the accumulator 252 to provide suspension springing/damping. The check valve 284 allows flow to pass back around the droop limiting valve 282.

Figure 15:
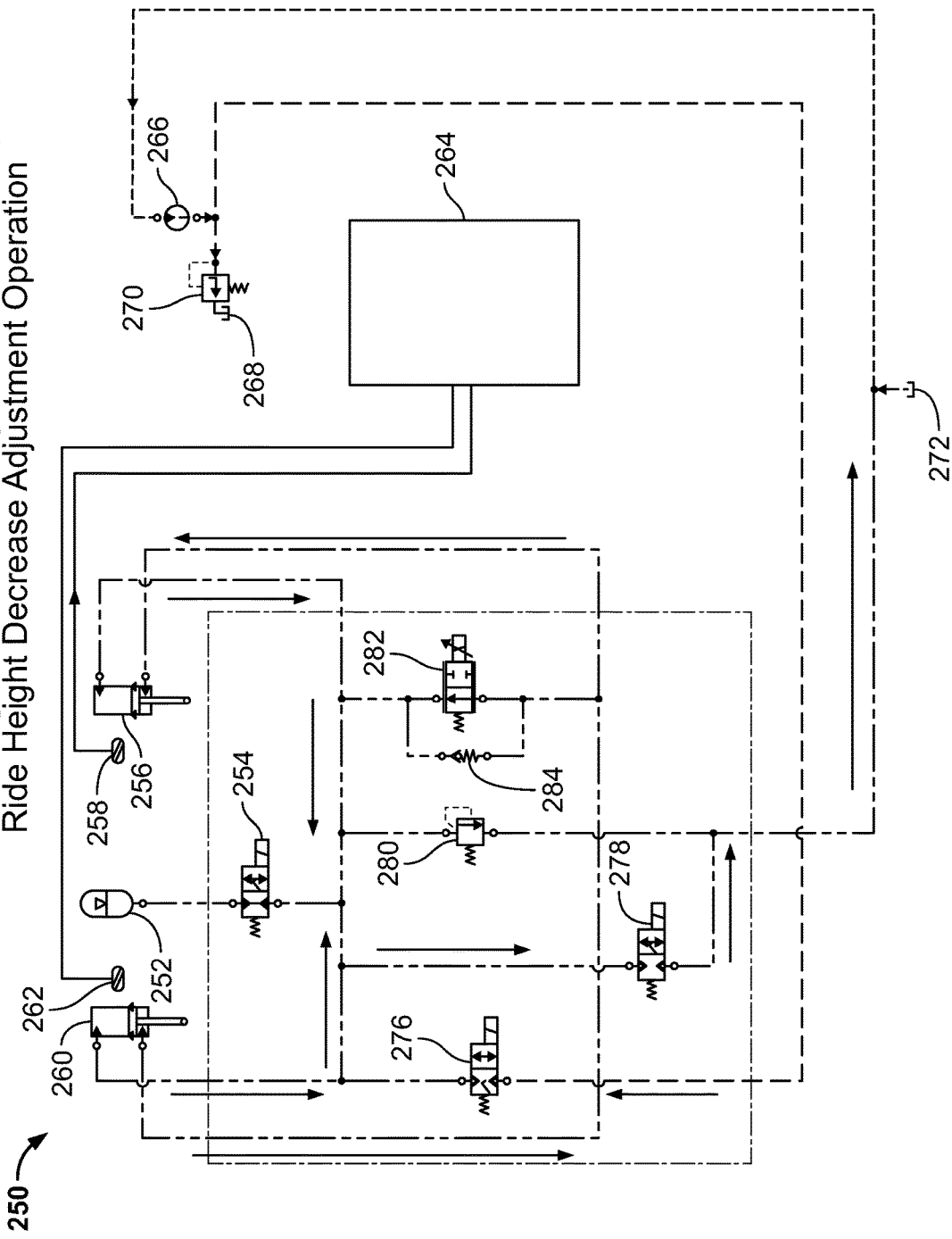
FIG. 15 is a hydraulic circuit of FIG. 12 in a ride height decrease adjustment operation mode.

FIG. 15 is the hydraulic circuit 250 of FIG. 12 in a ride height decrease adjustment operation mode. To lower the rear end of the windrower, pressure/fluid from the hydraulic actuators 156, 160 is dumped to tank via the accumulator dump valve 278. The weight of the windrower is suspended by the hydraulic actuators 256, 260 and by the accumulator 252. The accumulator master valve 254 is actuated into an open position, the droop limiting valve 282 is actuated into an open position, and the master/pressure control valve 276 is actuated into a closed position. The dump valve 278 is actuated into an open position to allow flow from the hydraulic actuators 256, 260 to drain to tank, thereby lowering the rear of the windrower. Flow is open between the hydraulic actuators 256, 260 and the accumulator 252 to provide suspension springing/damping. The check valve 284 allows flow to pass back around the droop limiting valve 282.

Figure 16:
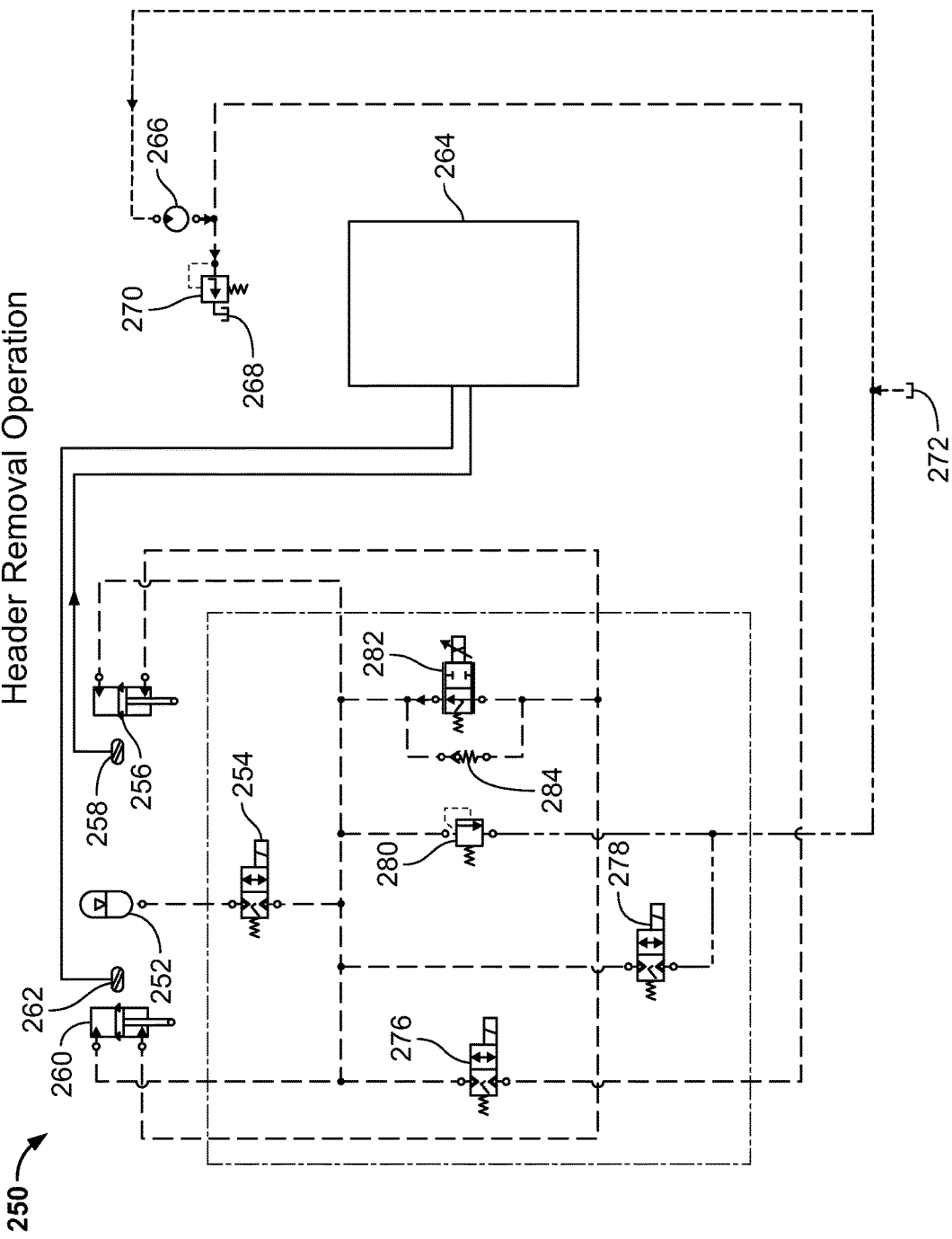
FIG. 16 is the hydraulic circuit of FIG. 12 in header removal operation mode.

FIG. 16 is the hydraulic circuit 250 of FIG. 12 in a header removal operation mode. In such operation, the rear end generally squats excessively. The accumulator master valve 254 is closed and the hydraulic actuators 256, 260 are extended to a predetermined height. Thus, the hydraulic actuators 256, 260 are extended. Pressurized fluid is trapped in the barrel ends of the hydraulic actuators 256, 260, thereby allowing cross-flow only between the barrel ends. The weight of the windrower is suspended by the actuators 256, 260 (not the accumulator 252). The accumulator master valve 254 is actuated into a closed position and does not allow flow between the hydraulic actuators 256, 260 and the accumulator 252. The droop limiting valve 282 is actuated into an open position, the master/pressure control valve 276 is actuated into a closed position, and the dump valve 278 is actuated into a closed position. The rear of the windrower is not damped or sprung in this state. Free flow is allowed between the barrel ends of the hydraulic actuators 256, 260 to allow axle articulation. The check valve 284 allows flow to pass back around the droop limiting valve 282.

Figure 17:
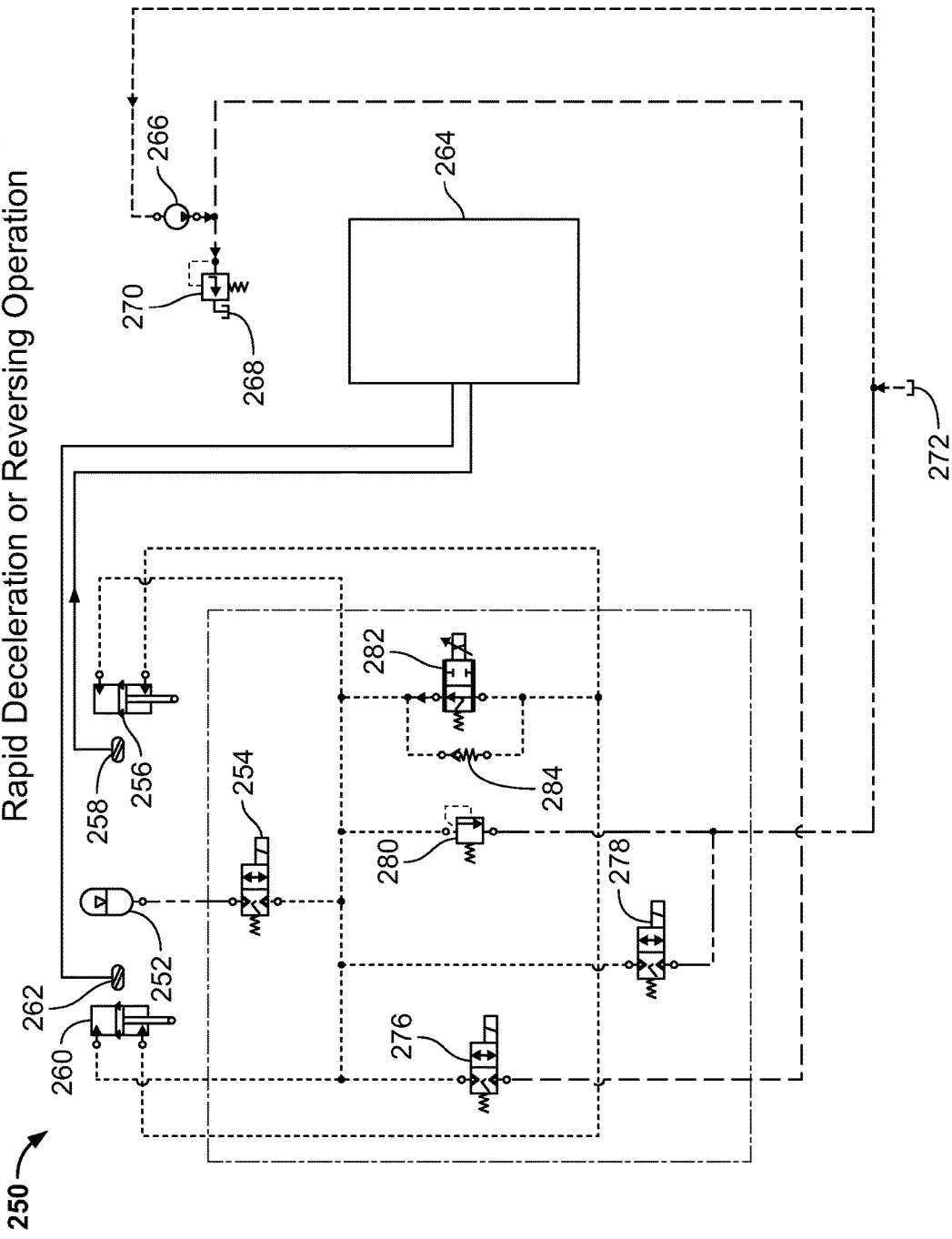
FIG. 17 is a hydraulic circuit of FIG. 12 in a rapid deceleration or reversing operation mode.

FIG. 17 is the hydraulic circuit 250 of FIG. 12 in a rapid deceleration or reversing operation mode. The droop limiting valve 282 is closed, which prevents the hydraulic actuators 156, 160 from further extension. This prevents excessive nose-dive during episodes of rapid deceleration. The weight of the windrower is suspended by the actuators 256, 260 and by the accumulator 252. The accumulator master valve 254 is actuated into an open position, the master/pressure control valve 276 is actuated into a closed position, and the dump valve 278 is actuated into a closed position. The droop limiting valve 282 is actuated into a closed position and does not allow extension of the hydraulic actuators 256, 260 during acceleration, thereby preventing nosediving of the windrower. The check valve 284 allows flow to pass into the rod ends of the hydraulic actuators 256, 260 to allow retraction, thereby providing damping to the system should a bump be encountered during deceleration.

Figure 18:
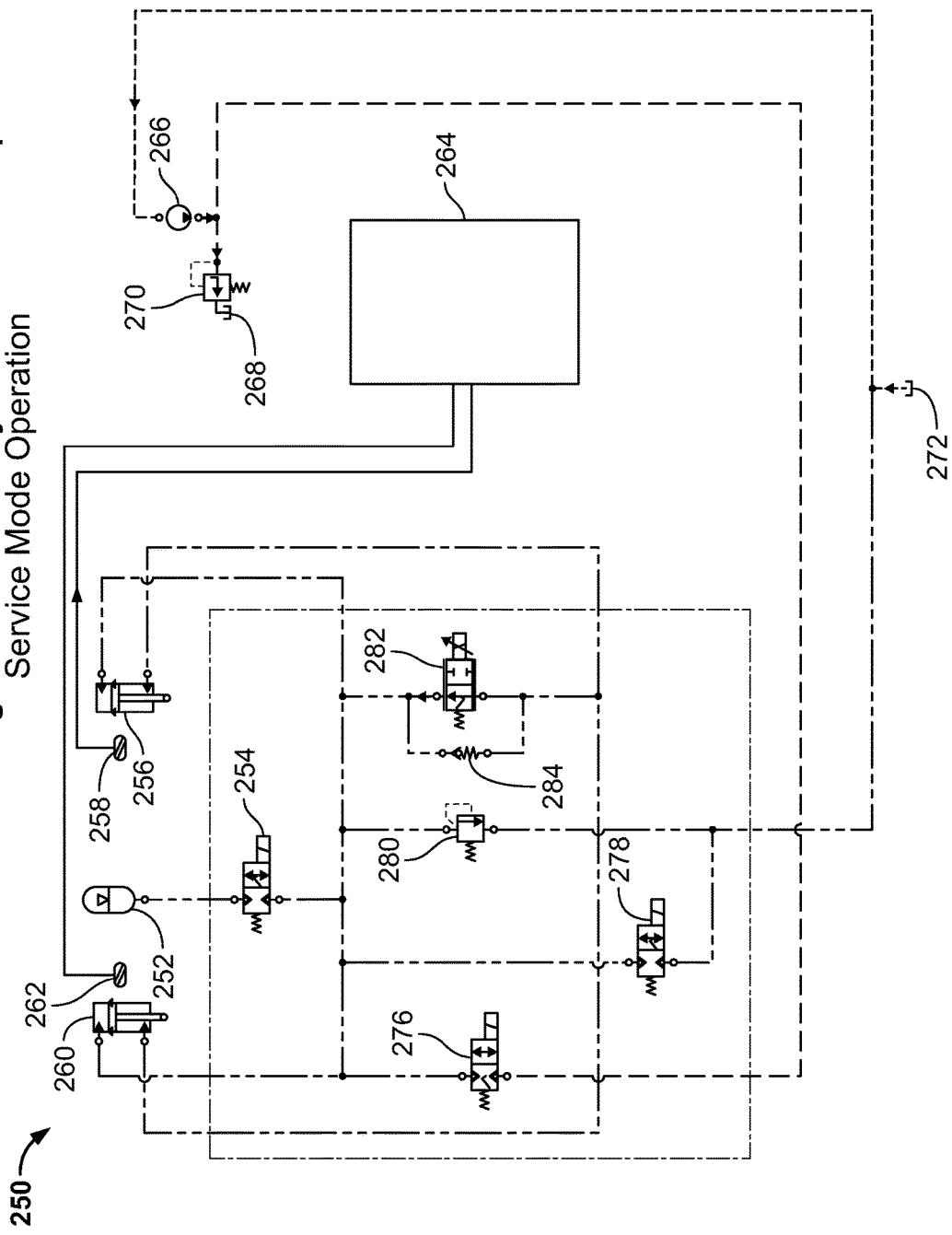
FIG. 18 is a hydraulic circuit of FIG. 12 in a service operation mode.

FIG. 18 is the hydraulic circuit 250 of FIG. 12 in a service operation mode. All valves are open to tank, allowing the hydraulic actuators 156, 260 to retract fully, causing the windrower to settle down on the rear axle bump stops. The weight of the windrower is resting rigidly on the axle 132. The master/pressure control valve 276 is actuated into a closed position, blocking flow from the pump 266 into the system. The dump valve 278 is actuated into an open position, draining flow from the hydraulic actuators 256, 260 to tank. The accumulator master valve 254 is actuated into an open position, draining fluid from the accumulator 252 to tank through the dump valve 278. The droop limiting valve 282 is actuated into an open position. No pressure is present in the suspension hydraulic system between the valves 276, 278.

Figure 19:
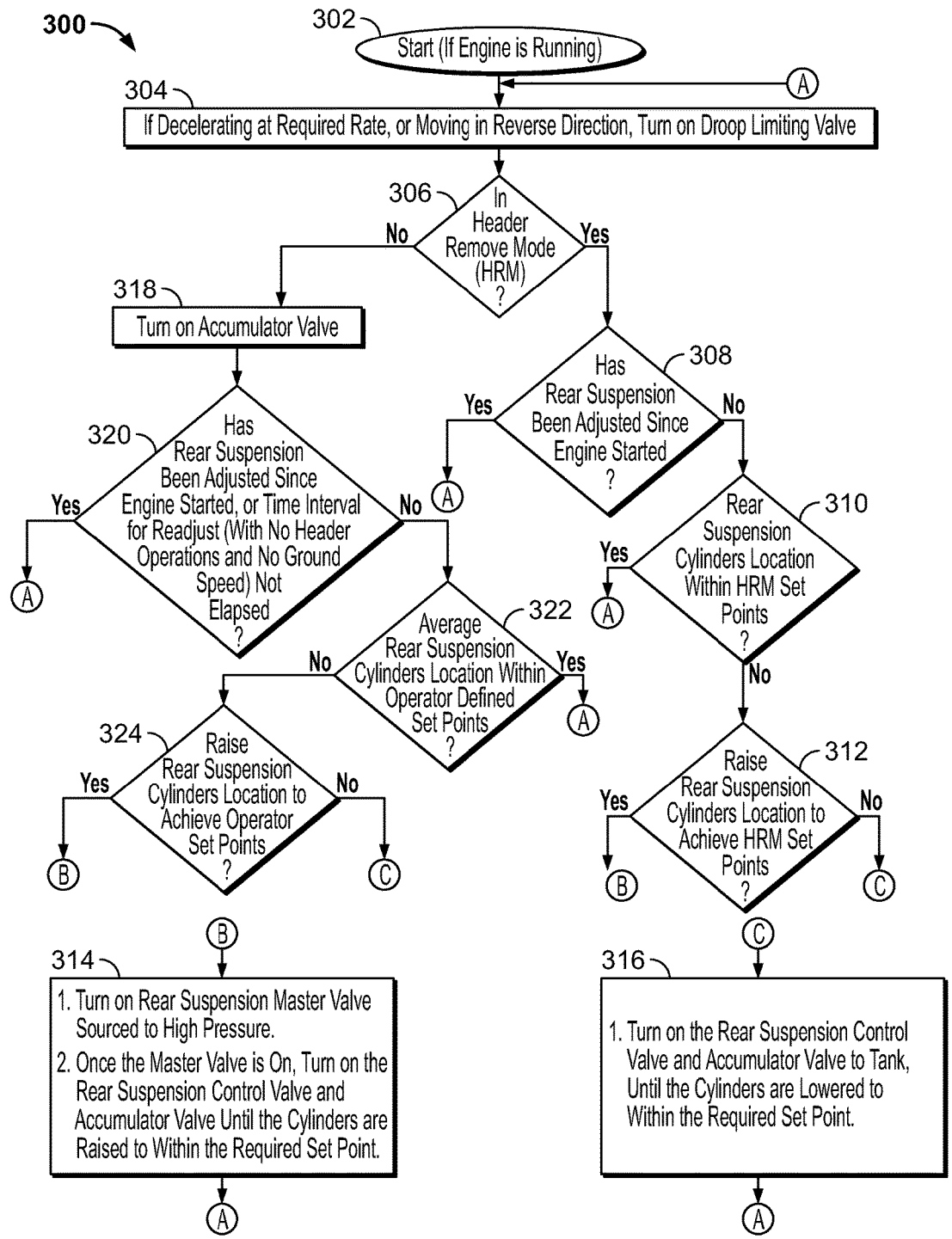
FIG. 19 is a flow chart for control logic of the hydraulic circuit.

FIG. 19 is a flow chart which illustrates the logic tree 300 in a controller and software system that controls when and if the ride height of the windrower is adjusted. At step 302, the process starts if the engine of the windrower is running. At step 304, if the windrower is detected to be decelerating at a required rate or moving in a reverse direction, the droop limiting valve is turned on. At step 306, a determination is made whether the windrower is in a header remove mode (HRM) of operation. If the windrower is in HRM, at step 308, a determination is made whether the rear suspension has been adjusted since the engine was started. If yes, the process returns to step 304.

If no, at step 310, a determination is made whether the rear suspension hydraulic actuator location is within the HRM set points. If yes, the process returns to step 304. If no, at step 312, a determination is made whether to raise the rear suspension hydraulic actuator location to achieve the HRM set point. If yes, at step 314, the rear suspension master valve sourced to high pressure is turned on, and after the master valve is turned on, the rear suspension control valve and accumulator valve are turned on until the hydraulic actuators are raised to within the required set point. If no, at step 316, the rear suspension control valve and the accumulator valve are turned on to tank until the hydraulic actuators are lowered to within the required set point.

If at step 306 the windrower is not at HRM, at step 318, the accumulator valve is turned on. At step 320, a determination is made whether the rear suspension has been adjusted since the engine was started, or whether the time interval for readjustment (with no header operations and no ground speed has elapsed. If yes, the process returns to step 304. If no, at step 322, a determination is made whether the average rear suspension hydraulic actuator position is within the operator defined set points. If yes, the process returns to step 304. If no, a determination is made whether to raise the rear suspension hydraulic actuator position to achieve the operator set points. If yes, step 314 is performed. If no, step 316 is performed.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A harvester, comprising:
   a vehicle frame configured for attachment to an implement to be moved in a longitudinal working direction across the ground;
   at least one rear axle positioned transversely to the longitudinal working direction of the harvester and operably attached to the vehicle frame;
   first and second casters pivotally mounted to the rear axle; and
   first and second hydraulic actuators, each in fluid communication with at least one hydraulic circuit, operably mounted to the rear axle and configured for adjusting a ride height of the harvester during operation of the harvester in one or more operable modes.

2. The harvester of claim 1, wherein the one or more operable modes comprise a first operable mode in which the harvester operates with the implement at normal speeds, a second operable mode in which the ride height of the harvester is adjusted up or down, and a third operable mode in which the implement is removed from the harvester.

3. The harvester of claim 2, wherein the one or more operable modes comprise a fourth operable mode in which the harvester undergoes rapid deceleration, and a fifth operable mode in which the harvester is services.

4. The harvester of claim 1, comprising one or a plurality of sensors configured to detect the ride height of the harvester.

5. The harvester of claim 4, wherein the sensors are rotational potentiometers.

6. The harvester of claim 1, comprising one or a plurality of sensors configured to detect a magnitude of extension or retraction of the first and second hydraulic actuators.

7. The harvester of claim 6, wherein the sensors are linear sensors internal to the first and second hydraulic actuators.

8. The harvester of claim 1, wherein barrel ends of the first and second hydraulic actuators are in fluid communication, and rod ends of the first and second hydraulic actuators are in fluid communication.

9. The harvester of claim 1, comprising an accumulator in fluid communication with the first and second hydraulic actuators.

10. The harvester of claim 9, wherein the accumulator is in fluid communication with the first and second hydraulic actuators via a hydraulic valve manifold.

11. The harvester of claim 10, wherein the hydraulic valve manifold is in fluid communication with a pump and a tank.

12. The harvester of claim 1, comprising a first pair of ground wheels mounted on the first and second casters.

13. The harvester of claim 1, comprising a ballast box mounted to a rear edge of the vehicle frame.

14. The harvester of claim 1, wherein the harvester is chosen from: a windrower, a lawn mower, a forage harvester, or a tractor.

* * * * *